United States Patent
Gluhovsky et al.

(10) Patent No.: US 7,346,736 B1
(45) Date of Patent: Mar. 18, 2008

(54) SELECTING BASIS FUNCTIONS TO FORM A REGRESSION MODEL FOR CACHE PERFORMANCE

(75) Inventors: Ilya Gluhovsky, Mountain View, CA (US); David Vengerov, Sunnyvale, CA (US); John R. Busch, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 250 days.

(21) Appl. No.: 11/243,353

(22) Filed: Oct. 3, 2005

Related U.S. Application Data

(63) Continuation-in-part of application No. 11/011,329, filed on Dec. 13, 2004.

(51) Int. Cl.
*G06F 12/00* (2006.01)
(52) U.S. Cl. .................. 711/118; 711/133; 711/134; 714/701; 714/702; 714/704; 714/718; 702/108; 702/119; 702/120
(58) Field of Classification Search .................. 711/118
See application file for complete search history.

(56) References Cited

OTHER PUBLICATIONS

Gluhovsky, Vengerov and O'Krafka, by Sun Microsystems Laboratories, "Comprehensive Multivariate Extrapolation Modeling of Multiprocessor Cache Miss reates", Jul. 2006, ACM Journal Name, vol. V.*
Publication entitled: "Monotone Regression Splines in Action" by J.O. Ramsay, Statistical Science, vol. 3, No. 4 (Nov. 1988) pp. 425-441. http://www.jstor.org/.
Publication entitled: "Bayesian Regression with Multivariate Linear Splines", by C.C. Holmes et al., 2001 Royal Statistical Society, J.R. Statist. Soc. B (2001) 63, part 1, pp. 3-17.
Publication entitled: "Feasible Nonparametric Estimation of Multiargument Monotone Functions", by Hari Mukarjee et al., Journal of the American Statistical Association, vol. 89, No. 425 (Mar. 1994), pp. 77-80.
Publication entitled: Data-Driven Bandwidth Selection in Local Polynomial Fitting: Variable Bandwidth and Spatial Adaptation, by Jianqing Fan et al., Journal of the Royal Statistical Society, Series B (methodological), vol. 57, No. 2 (1995), pp. 371-394.
Publication entitled: "Multiplicative Updates for Nonnegative Quadratic Programming in Support Vector Machines", by Fei Sha et al., University of Pennsylvania, Advances in Neural Information Processing Systems 15 (NIPS 2002), pp. 1065-1072.

* cited by examiner

*Primary Examiner*—Hong Kim
*Assistant Examiner*—Zhuo H. Li
(74) *Attorney, Agent, or Firm*—Park, Vaughan & Fleming LLP

(57) ABSTRACT

One embodiment of the present invention provides a system that selects bases to form a regression model for cache performance. During operation, the system receives empirical data for a cache rate. The system also receives derivative constraints for the cache rate. Next, the system obtains candidate bases that satisfy the derivative constraints. For each of these candidate bases, the system: (1) computes an aggregate error E incurred using the candidate basis over the empirical data; (2) computes an instability measure I of an extrapolation fit for using the candidate basis over an extrapolation region; and then (3) computes a selection criterion F for the candidate basis, wherein F is a function of E and I. Finally, the system minimizes the selection criterion F across the candidate bases to select the basis used for the regression model.

25 Claims, 14 Drawing Sheets

SELECTING BASIS FUNCTIONS TO FORM A REGRESSION MODEL FOR CACHE PERFORMANCE

RELATED APPLICATION

This application is a continuation-in-part of a pending U.S. patent application Ser. No. 11/011,329, filed 13 Dec. 2004 entitled, "Method and Apparatus for Using an Extrapolation Model to Predict Cache Performance," by inventors Ilya Gluhovsky, David Vengerov and John R. Busch. This application hereby claims priority under 35 U.S.C. §120 to the above-listed parent patent application.

BACKGROUND

1. Field of the Invention

The present invention relates to techniques for modeling the performance of computer systems. More specifically, the present invention relates to a method and an apparatus for selecting bases to form a regression model that can be used to extrapolate cache performance.

2. Related Art

To increase the speed of memory references, computer systems typically provide multiple levels of caches, which are used to store frequently used operands and instructions closer to the processor to achieve faster access times. There are a large number of tradeoffs between the cache design variables, such as, cache size, line size, associativity, amount of sharing, etc. Hence, the process of designing a cache requires considering many possible cache designs. Moreover, while optimizing the design of a cache, it is desirable to be able to estimate the performance of different cache designs without actually having to implement the different cache designs.

Performance estimates for various cache designs are typically generated using system performance models driven by trace data from one or more benchmarks of interest. These performance models are typically used to produce specific cache event rates. For example, a performance model can determine how often an instruction generates a read or a write request that misses in a given level of cache memory.

Unfortunately, not all system configurations can be modeled using trace data. For example, only configurations with at most as many processors as in the trace collection system can be simulated. Therefore, it is not possible to simulate future designs which have more processors than the existing systems that were used to generate the trace data. Additionally, configurations with large numbers of processors sharing a cache cannot be simulated accurately. Furthermore, prohibitively long traces are required to simulate large caches due to cache "warming" requirements. Consequently, a system designer is typically required to extrapolate cache rates from smaller systems to obtain performance numbers for systems with larger numbers of processors, larger degrees of sharing and/or larger cache sizes.

Statistical regression models can be used to extrapolate these cache rates. However, the accuracy of such a regression model is highly dependent on the choice of bases for the regression model. Some bases fit the empirical data well, but are relatively unstable in the extrapolation region, whereas other bases are stable in the extrapolation region but fit the empirical data less well.

Hence, what is needed is a method and an apparatus for selecting bases to form a regression model, which strikes a balance between fitting the empirical data and stability in the extrapolation region.

SUMMARY

One embodiment of the present invention provides a system that selects bases to form a regression model for cache performance. During operation, the system receives empirical data for a cache rate. The system also receives derivative constraints for the cache rate. Next, the system obtains candidate bases that satisfy the derivative constraints. For each of these candidate bases, the system: (1) computes an aggregate error E incurred using the candidate basis over the empirical data; (2) computes an instability measure I of an extrapolation fit for using the candidate basis over an extrapolation region; and then (3) computes a selection criterion F for the candidate basis, wherein F is a function of E and I. Finally, the system minimizes the selection criterion F across the candidate bases to select the basis used for the regression model.

In a variation on this embodiment, computing the selection criterion involves computing $F=E+\eta I$.

In a variation on this embodiment, computing the aggregate error E for the candidate basis involves using a cross-validation technique to compute the aggregate error E.

In a variation on this embodiment, computing the instability measure I over the extrapolation region for the candidate basis involves: (1) identifying a grid that covers the extrapolation region; (2) performing a residual bootstrap operation to obtain confidence interval lengths for the fit at the grid vertices subject to using a given basis; and (3) computing the instability measure I as the median of the confidence interval lengths.

In a variation on this embodiment, the roughness penalty coefficient is optimized for each candidate basis and the aggregate error E is computed for the optimal value of the roughness penalty coefficient.

In a variation on this embodiment, obtaining the candidate bases additionally involves using a cross-validation technique to compute a roughness penalty coefficient $\lambda$ (which is part of a fitting criterion) for each candidate basis.

In a variation on this embodiment, obtaining candidate bases that satisfy the derivative constraints involves obtaining B-spline functions that satisfy the derivative constraints.

In a further variation, obtaining bases that satisfy the derivative constraints involves: using a linear combination of integrated B-splines with non-negative coefficients to approximate monotonically increasing functions; using integrated B-splines with negative coefficients to approximate monotonically decreasing functions; using twice-integrated B-splines with positive coefficients to approximate convex functions; and using twice-integrated B-splines with negative coefficients to approximate concave functions.

In a variation on this embodiment, the system subsequently uses the regression model to extrapolate cache performance. This involves first optimizing coefficients of the regression model subject to the derivative constraints so that the regression model fits the empirical data. Next, the system uses the optimized regression model to extrapolate the cache rate beyond a region covered by the empirical data.

In a further variation, the regression model is a nonnegative linear combination of bases. In this variation, optimizing the coefficients of the regression model involves optimizing coefficients of the nonnegative linear combination of bases to fit the empirical data subject to the derivative constraints.

In a further variation, forming the regression model additionally involves forming multivariate bases for the cache rate by performing tensor product operations on univariate bases for the cache rate.

In a variation on this embodiment, the derivative constraints can specify that the bases are: concave increasing; concave increasing with a linear asymptote; concave increasing with a horizontal asymptote; convex decreasing; convex decreasing with a horizontal asymptote; or linear.

In a variation on this embodiment, the regression model expresses the cache rate as a function of: cache size; line size; associativity; coherence protocol; degree of sharing; and/or number of processors.

Figure 1:
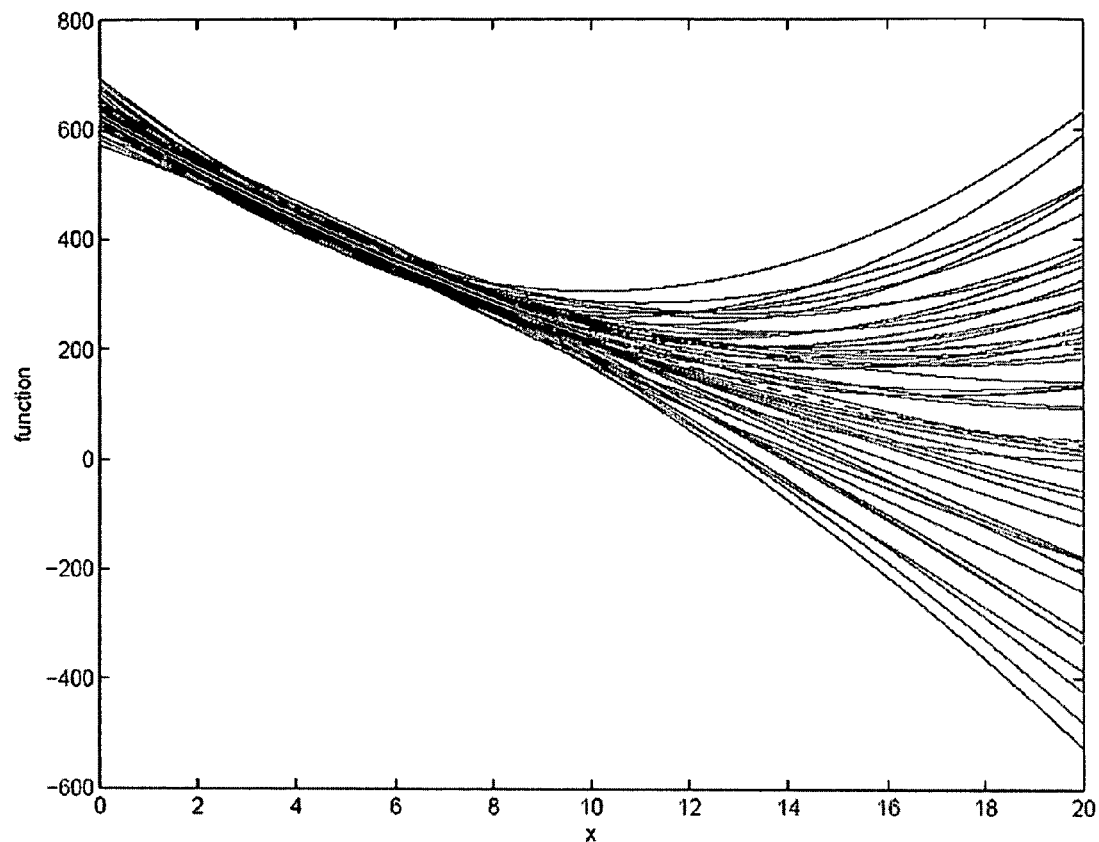
FIG. 1 illustrates 50 global quadratic extrapolation polynomial fits in accordance with an embodiment of the present invention.

Table 1 presents cache configuration parameters and their ranges in accordance with an embodiment of the present invention.

Table 2 presents model errors estimated by 10-fold cross-validation for different values of the roughness penalty coefficient $\lambda$ in accordance with an embodiment of the present invention.

Table 3 presents percentiles of absolute residuals in accordance with an embodiment of the present invention.

Table 4 presents percentiles of responses in the data set and of the fit over the entire domain in accordance with an embodiment of the present invention.

Table 5 presents percentiles of 90% bootstrap confidence interval lengths over the data locations and the entire domain in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Overview

The present invention provides an approach to building multivariate regression models that can be used to extrapolate cache performance beyond the range of empirical data. This approach attempts to accurately estimate the high-level trend of the data, which can be extended in a natural way. Derivative constraints, such as monotonicity, convexity or concavity, are used to restrict the choice of a high-level trend, which would otherwise remain rather arbitrary. This extrapolation model also incorporates these constraints in multiple dimensions.

One embodiment of the present invention describes the trend as a nonnegative linear combination of twice-integrated multivariate B-splines and their variations. The specific bases in this approach are chosen so that any such combination is a plausible a priori model. As a result, one can optimize basis function coefficients to fit the data best without losing control over the high-level trend of the extrapolation model.

This approach also allows one to use standard model selection techniques. We illustrate this by applying cross-validation to smoothing parameter selection.

Introduction

Many naturally arising problems involve extrapolation. An example that most readily comes to mind is the desire to predict the future, that is, extrapolation along the time dimension. Another example involves reliability problems, where a component that has a long time before failure is operated in a stress mode in order to cause a failure within a shorter timeframe. One is then interested in predicting a characteristic of the component in a normal mode of operation from the obtained failure data.

Another example of crucial need for extrapolation is the problem of computer system design. Typically, many architectural tradeoffs need to be evaluated. In this domain, performance analysis is carried out for a large set of architectures. For each architecture, a set of parameters abstracting that architecture is fed into a system model that gives performance predictions. It turns out that it is not technically feasible to come up with the required set of parameters for a large percentage of interesting architectures. For example, these include systems with a large number of processors or with large caches. Thus, one is required to extrapolate along the dimensions of the number of processors and the cache sizes.

Our approach to nonlinear extrapolation modeling is based on the following premise: shape constraints on the fitted function are fundamental in controlling the behavior and variability of the extrapolation fit. Naturally, we expect all functions that satisfy the constraints to give a priori reasonable fits. Of course, we will then choose the function that optimizes a fitting criterion that includes fit and, possibly, roughness penalties. Even more importantly, the constraints must be rigid enough, so that if two functions that satisfy the constraints imply notably different extrapolation fits, they should be far enough over the data region for the data to be able to discriminate between them. This is to say that a situation where two functions follow each other (and the data) closely and then diverge in different directions in the extrapolation region is unacceptable. Therefore, this will typically mean that for the purposes of extrapolation, we can only model high level trends of the data. Also note that this does not preclude us from uncovering local features in the data using a more flexible (less constrained) model. We do not mind a situation where two models that are (locally) different over the data give similar extrapolation fits!

Since we view proper introduction of constraints as the cornerstone of this methodology, we would like to briefly discuss problems encountered when using standard unconstrained regression methods in the nonlinear extrapolation setting. Let us consider three kinds of models: global polynomial/parametric models, local polynomial models, and (unconstrained) multivariate smoothing splines.

In global polynomial models, a single polynomial is fitted to the data. Its behavior is loose beyond the range of the data and does not in general reflect the trend observed within the data region. To see that, we fit a quadratic polynomial to 21 equally spaced data points with the x-values of zero through ten with step 0.5 (0, 0.5, 1, etc.) and y-values of $(25-x)^2$ (shown in FIG. 1) contaminated with additive Gaussian noise with the standard deviation of 50. The experiment is repeated with 50 different noise realizations. For each one, a global quadratic polynomial is fitted via least squares. The resultant fits are shown in FIG. 1 in over the domain that extends up to x=20. The target function is convex decreasing over the domain of [0, 20]. Note that the model is correct: a quadratic target is fitted by a quadratic model. In spite of that typical extrapolation variability is seen to be very large compared to that over the data region. Qualitatively, the fits corresponding to different noise realizations look to be very different from each other. A large proportion of the fits have an upward trend. It is typically caused by a few noisy data points towards the right end of the data region and does not represent a high level trend of the data. Small perturbations of the data set result in large changes of the extrapolation fit. We expect the phenomenon to hold generally in many parametric settings. Additionally, in a real life scenario, the model itself may be in question. It is conceivable for two different models (for example, fitting polynomials of degrees 6 and 7) to give similar quality fits over the data and then give radically different extrapolation fits.

Figure 2:
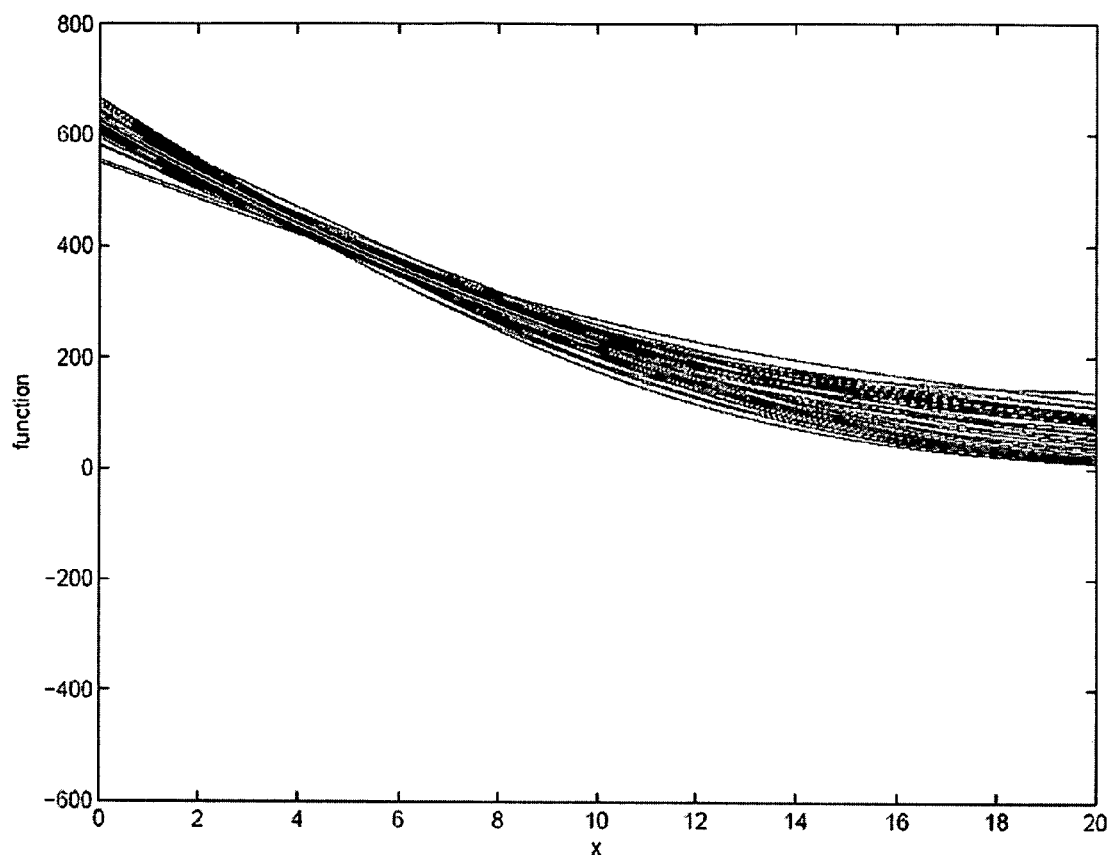
FIG. 2 illustrates 50 constrained spline extrapolation fits in accordance with an embodiment of the present invention.

Let us now see how dramatically the situation changes upon introduction of the constraints. FIG. 2 shows the fits for the same noise realizations using a nonincreasing convex spline model described in detail in a following section. The y-axis is given the same limits as those of FIG. 1. It is easily seen that the extrapolation behavior is much tighter and much closer to the actual function. Also note that we did not use the knowledge of the actual quadratic shape.

Next, consider extrapolating with a local polynomial model. To begin with, we note that the notion of locality becomes superfluous, since there are no local data points for an extrapolation location. Therefore, the standard justification of such a model does not carry over. To see what happens if the procedure is applied formally, we use the same setup as above except the target function is chosen to be exp(-x/10). This is done in order to avoid fitting a global quadratic polynomial above with a local quadratic model, for in that case, the best local model is the global one. The standard deviation of the noise is 0.081. We use the Gaussian kernel $$K(x, x_0) = \exp\left(-\left(\frac{x - x_0}{h}\right)^2\right)$$

whose bandwidth h is chosen by generalized cross-validation. The same bandwidth is used for all noise realizations. It is obtained by minimizing the sum of generalized cross-validation errors over the noise realizations.

Figure 3:
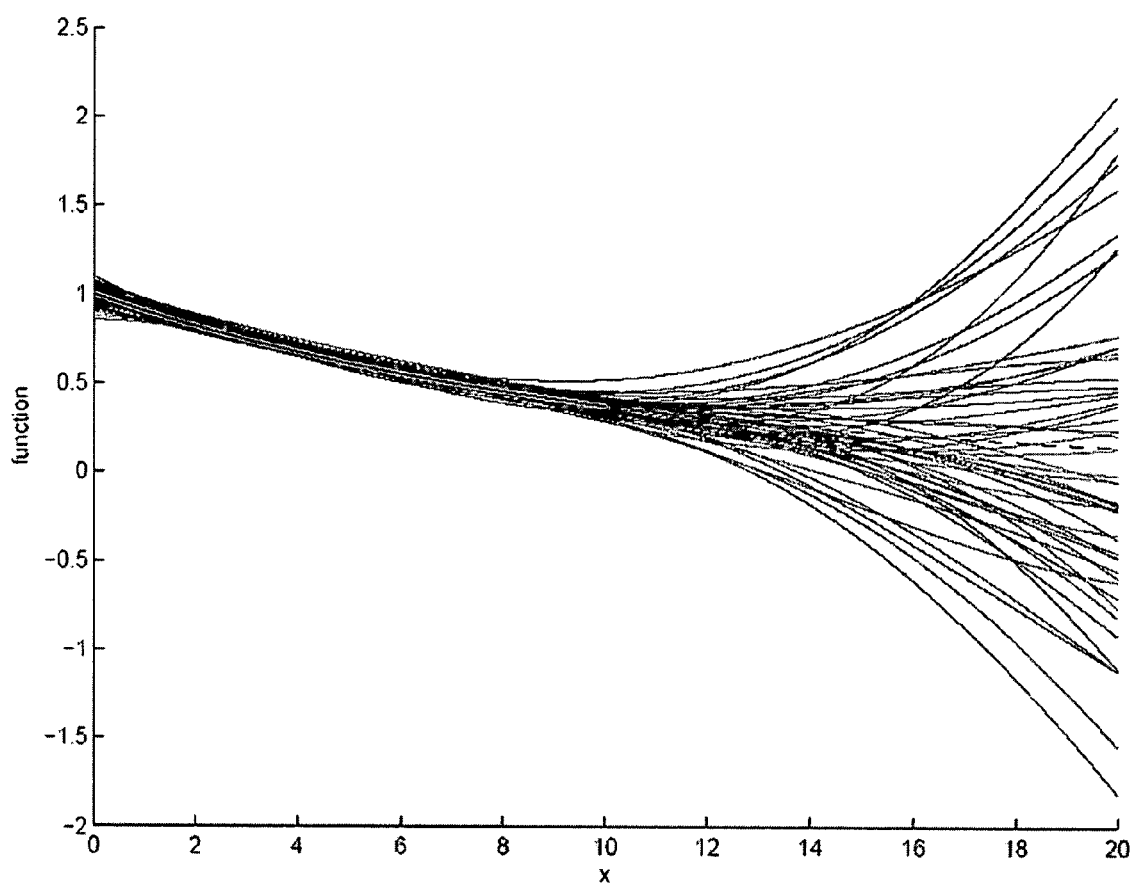
FIG. 3 illustrates 50 locally linear extrapolation fits in accordance with an embodiment of the present invention.
Figure 4:
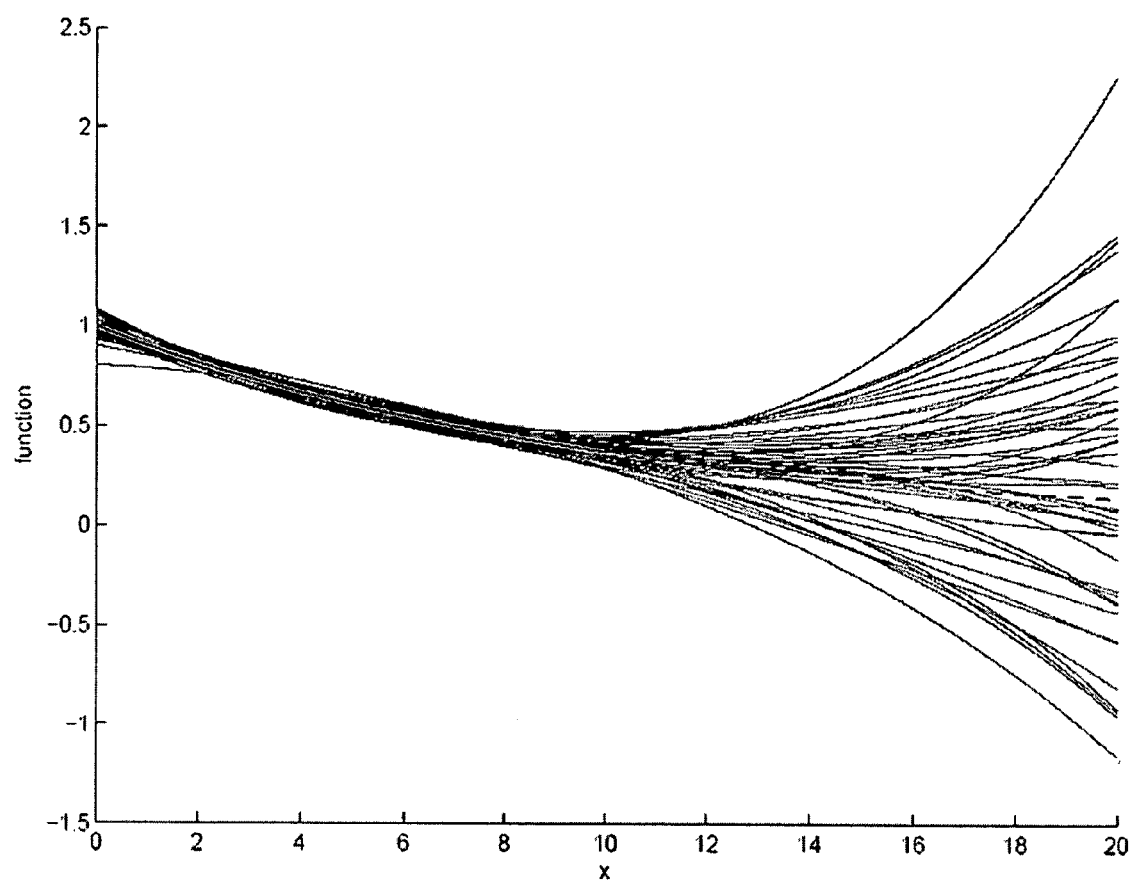
FIG. 4 illustrates 50 locally quadratic extrapolation fits in accordance with an embodiment of the present invention.
Figure 5:
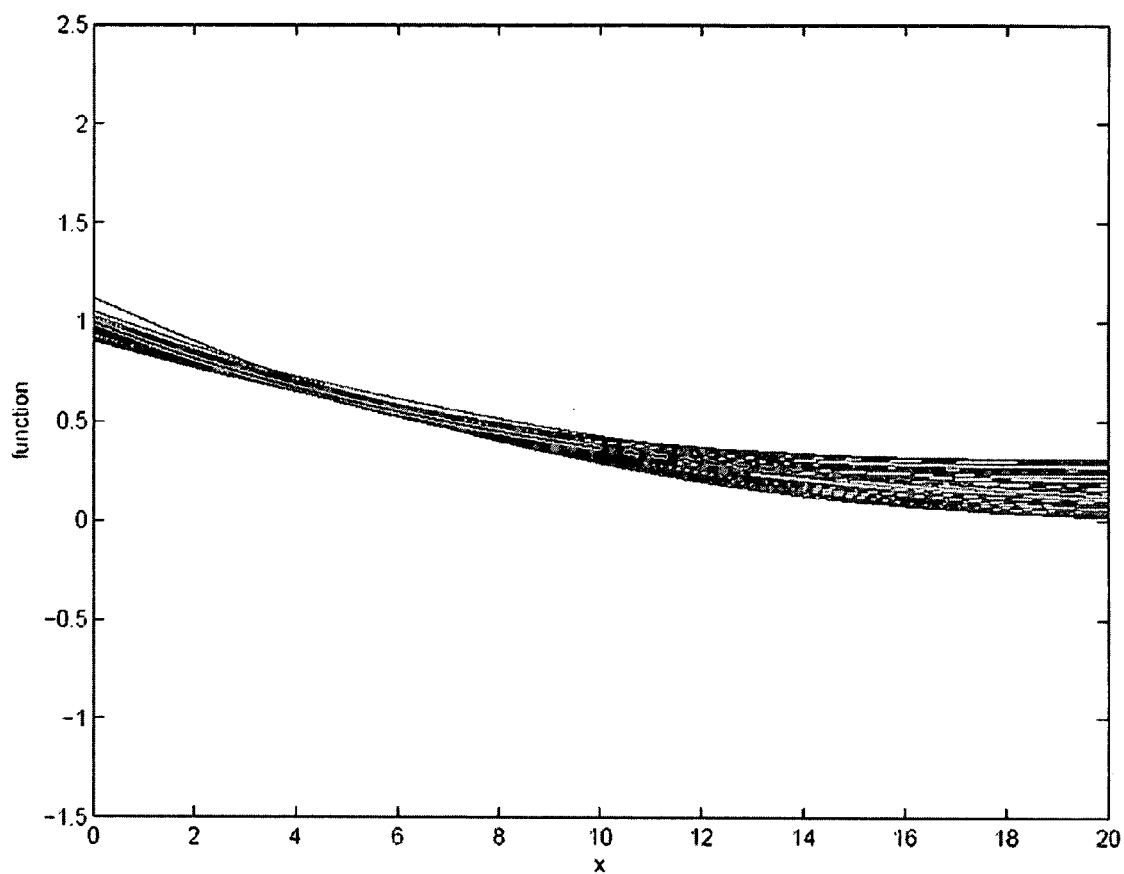
FIG. 5 illustrates 50 constrained spline extrapolation fits in accordance with an embodiment of the present invention.

FIGS. 3 and 4 show 50 local linear and 50 local quadratic fits respectively corresponding to 50 different noise realizations. The respective bandwidths h are 3.2 and 8. These figures are qualitatively similar to what we saw in the global polynomial case above. FIG. 5 shows the corresponding nonincreasing convex spline model fits. These are again seen to be tight and close to the actual function. Thus, the introduction of shape constraints is seen to be crucial in controlling the behavior of an extrapolation fit.

Standard spline modeling does not adequately address the problem of extrapolation either. In the case of a regression spline, having no knots beyond the data region results in polynomial extrapolation, where data points that are closer to the near boundary of the data region have greater impact. As a result, the fitted polynomial is even more loosely determined and so is even more unpredictable than in the case of global polynomial models. Placement of knots beyond the data region limits the connection between the data and the extrapolation fit even more and makes the above problem even worse. An introduction of a roughness penalty in terms of an integrated second derivative functional simply makes the fit be a compromise between a linear one and an unpredictable polynomial. Note that in the case of penalized splines, using the second order penalty results in a linear extrapolation.

Having thus emphasized the importance of constraints, we will now outline the proposed solution. In one embodiment of the present invention we analyze derivative constraints. Constraining the fit to be nonnegative, monotone and/or convex/concave amounts to requiring that the zero$^{th}$, first and/or second order partial derivatives be of appropriate signs. Let м denote the class of functions that satisfy the constraints. To define м, we first build univariate "bases" that satisfy the appropriate derivative constraints and are general enough, so that, for example, a large set of functions can be represented as their linear combinations. Specifically, we choose particular spline bases that have appropriate shapes. Now observe that if we restrict ourselves to taking their nonnegative linear combinations, the resultant functions also obey the derivative constraints. Additionally, we find that anticipating the shapes of nonnegative linear combinations is easy. In particular, we can make sure that the bases we use do not result in similarly behaving fits over data diverging in the extrapolation region as was mentioned above. It will also be seen that nonnegative linear combinations are typically easier to fit than less restrictive models satisfying derivative constraints. Further, modeling low-order interactions among predictors is done within the same framework by including tensor product bases of the constructed univariate bases. In a following section, we will formally describe the fitting process based on the roughness penalty approach.

Approaches to Fitting Constrained Extrapolation Models

In one embodiment of the present invention, derivative constraints play an important role in constraining the extrapolation model. Methods for fitting constrained regression models fall into two categories. Methods in the first category fit an unconstrained model first. Then the constraints are imposed with an idea to perturb the fit as little as possible to satisfy them. The second category fits a constrained model to begin with by carrying out constrained optimization of a fitting criterion.

The two-step methods of the first category clearly lack the requirements that we set out in the introduction. It is possible to have fits that are close over the data region, but diverge in the extrapolation region. As we have discussed, an unconstrained model typically has loose extrapolation behavior. Imposing constraints post factum on a fit that has little to do with the behavior of the data holds little promise.

Kernel-based constrained models fall into the first category. Some researchers have modified the kernel weights to make the fit monotone. Monotonization of more general local polynomial models has also been considered. We are not aware of any work where convexity/concavity constraints are imposed.

In the second category space, we will consider splines as a flexible modeling method. A univariate spline is a piecewise polynomial, whose pieces are glued together smoothly. More precisely, for a knot sequence $t_1 < \ldots < t_m$, a kth order spline coincides with kth order (degree k−1) polynomials between adjacent knots $t_i < t_{i+1}$ and has k−1 continuous derivatives. Splines of order k form a linear space of dimension k+m. B-splines $B_i(x)$ form a convenient basis for this space: they are nonnegative and are strictly positive over at most k+1 knots resulting in banded matrices and efficient computations. Their definition is given in the next section in equations (2) and (3). Any spline s(x) has representation $$s(x) = \sum_{i=1}^{k+m} B_i(x)\beta_i \quad (1)$$

for some coefficient vector $\beta$.

In one embodiment of the present invention, we construct univariate bases for different combinations of derivative constraints. From the univariate bases we build tensor product bases to model low order interaction effects. We then select the nonnegative coefficient vector that minimizes a fitting criterion. When choosing the univariate bases we also make sure that the basis functions are sufficiently different from each other over the domain of the data. Then the data are able to discriminate among different combinations, so that different extrapolation fits do not correspond to similar fits of the data. Thus, we arrive at the following justification.

Unconstrained models and 2-step constrained procedures result in loose fits and violate the extrapolation model requirements stated above. Therefore, we use a constrained model of the second category. Note that we can specify the class of considered functions. The simplest such class seems to be a parametric family with a small number of parameters. As an example, one could consider fitting $b_0 + ce^{-b(x-a)}$, $b_0 \geq 0$, $b \geq 0$ to a convex decreasing relationship. A disadvantage of such an approach lies in inflexibility of its functional form. In the above example, unless the decay is exponential, the model is unlikely to fit well. Therefore, one may choose to augment the class with a variety of shapes. In the example above, one may use a mixture of exponentials with different shape parameters. However, this is prone to overfitting. To prevent overfitting, one may choose to use regularization. This is the logic we followed when choosing constrained polynomial splines as a flexible class of considered functions and roughness penalty as regularization.

Extrapolation Model

In this section, we give details of constructing spline bases that satisfy derivative constraints. We note that not every such basis fulfills extrapolation model requirements. We discuss the choice of an appropriate basis in a following section.

To build a variety of univariate bases on an interval [a,b] that satisfy different sets of derivative constraints, we start with I-splines $I_i^{(nd)}(x)$ (see [Ramsay] J. O. Ramsay. (1988) "Monotone Regression Splines in Action," *Statistical Science*, vol. 3, no. 4, pp. 425-461), which are nondecreasing functions with a range of [0,1]. Taking $I_i^{(ni)}(x) = 1 - I_i^{(nd)}(x)$ produces a set of nonincreasing functions. Integrating $I_i^{(nd)}(x)$ ($I_i^{(ni)}(x)$) produces a set $I_i^{(ndv)}(x)(I_i^{(ndc)}(x))$ of nondecreasing convex (concave) functions. Then $I_i^{(niv)}(x) = I_i^{(ndv)}(t_{m+1}-x)$ and $I_i^{(nic)}(x) = I_i^{(ndc)}(t_{m+1}-x)$ are nonincreasing convex (concave), where constant $t^{m+1} \geq b$ is defined below. Multivariate functions are obtained by using tensor products of the univariate terms.

We now give mathematical details of the extrapolation model. We start with the univariate predictor case. First we construct B-splines over [a,b]. In doing so, we follow the construction in T. J. Hastie, R. J. Tibshirani and J. H. Friedman. (2001), "The Elements of Statistical Learning: Data Mining, Inference, and Prediction," Springer-Verlag New York. Given a knot sequence $t_1 < \ldots < t_m$, add boundary knots $t_0 < t_1$, $t_0 \leq a$ and $t_{m+1} > t_m$, $t_{m+1} \geq b$. Define the augmented knot sequence $\tau$ $$\tau_1 = \ldots = \tau_k = t_0$$

$$\tau_{k+i} = t_i, 1 \leq i \leq m$$

$$\tau_{k+m+1} = \ldots = \tau_{2k+m} = t_{m+1}$$

B-splines $B_i(x, k)$, $1 \leq i \leq k+m$, are defined by the following recursive formula:

$$B_i(x, 1) = \begin{cases} 1, & t_{i+1} \leq x \leq t_i \\ 0, & \text{otherwise} \end{cases} \quad (2)$$

$$B_i(x, k) = \frac{(x - \tau_i)B_i(x, k-1)}{\tau_{i+k-1} - \tau_i} + \frac{(\tau_{i+k} - x)B_{i+1}(x, k-1)}{\tau_{i+k} - \tau_{i+1}} \quad (3)$$

The basis functions $B_i(x, k)$ are nonzero only over $(t_{max(0, i-k)}, t_{min(i, m+1)})$ in terms of the knot sequence t. They are nonnegative and so are their nonnegative linear combinations. Thus, to obtain a nonnegative fit, one can optimize a fitting criterion with respect to nonnegative $\beta_i$ in (1).

We mention in passing that equations (2) and (3) can be used to define B-splines with repeated knots ($t_i = t_{i+1}$ for some i). If a denominator of a summand in (3) is zero, the summand is evaluated to zero by convention. Each repetition of a knot decrements the number of continuous derivatives at that knot. For example, if $t_{i-1} < t_i = t_{i+1} < t_{i+2}$, there are $k-2$ continuous derivatives at $t_i$.

To obtain a monotone fit, [Ramsay] proposes to define I-splines as being proportional to integrated B-splines. Since B-splines are nonnegative, their integrals are nondecreasing. A nonnegative nondecreasing fit can then be obtained by optimizing with respect to a nonnegative linear combination of coefficients. Formally, define $I_i^{(nd)}(x, k)$ as $$I_i^{(nd)}(x, k) = \frac{k}{\tau_{i+k} - \tau_i} \int_{t_0}^{x} B_i(u, k) du = \sum_{j=i+1}^{k+m+1} B_j(x, k+1), \quad (4)$$

$$1 \leq i \leq k+m.$$

Figure 6:
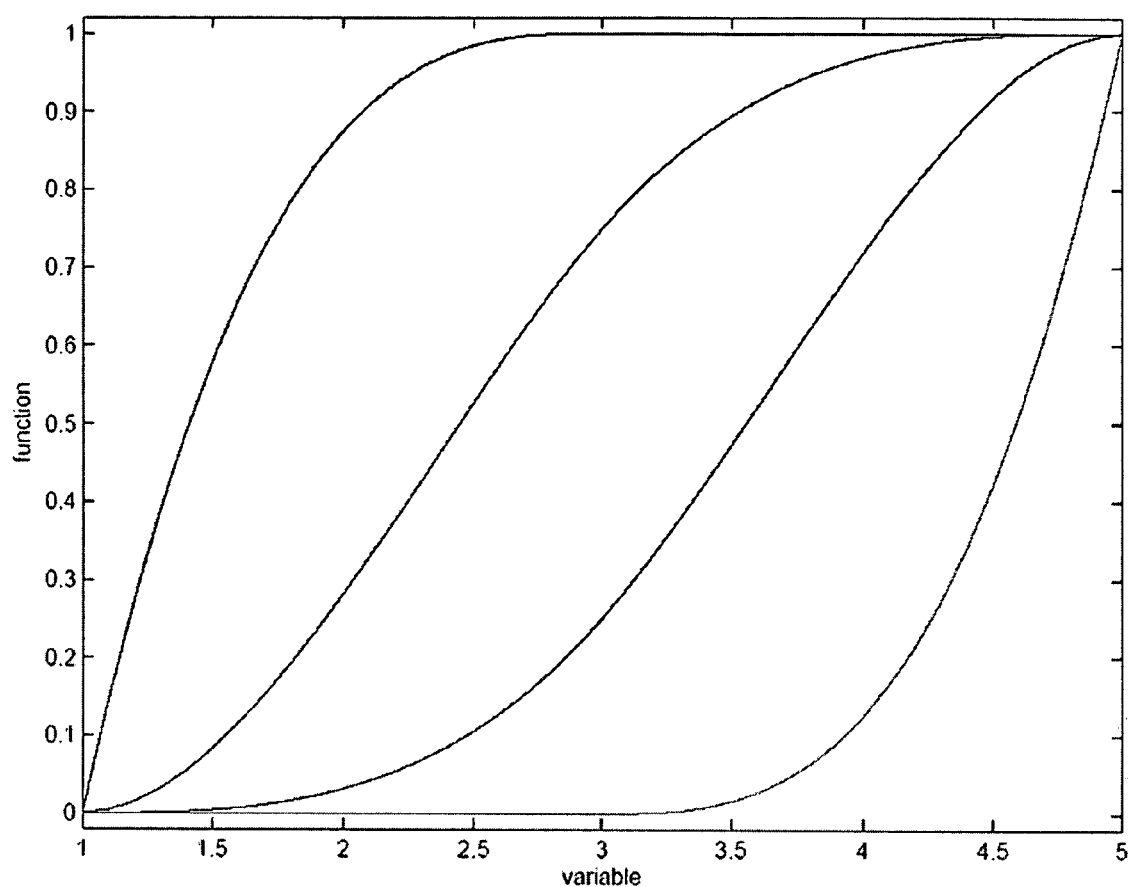
FIG. 6 illustrates I-splines in accordance with an embodiment of the present invention.

$I_i^{(nd)}(x, k)$ with boundary knots 1 and 5 and with an interior knot 3 and $k=3$ are shown in FIG. 6. They increase from zero to one. A nonnegative nonincreasing fit can be obtained by using $I_i^{(ni)}(x, k) = 1 - I_i^{(nd)}(x, k)$.

Using the same ideas, we define convex/concave bases. For example, a basis $I_i^{(ndv)}$ for a nondecreasing convex fit is obtained by integrating I-splines, $$I_i^{(ndv)}(x, k) = \int_{t_0}^{x} I_i^{(nd)}(u, k) du = \sum_{j=i+1}^{k+m+1} \frac{\tau_{j+k+1} - \tau_j}{k+1} \sum_{l=j+1}^{k+m+2} B_l(x, k+2), \quad (5)$$

where the $\tau$ sequence corresponds to $k+1$ (this is important to get the indices right). To define a nondecreasing concave basis $I_i^{(ndc)}$, we integrate $1 - I_i^{(nd)}$:

$$I_i^{(ndc)}(x, k) = \int_{t_0}^{x} 1 - I_i^{(nd)}(u, k) du = (x - t_0) - I_i^{(ndv)}(x, k). \quad (6)$$

Figure 7:
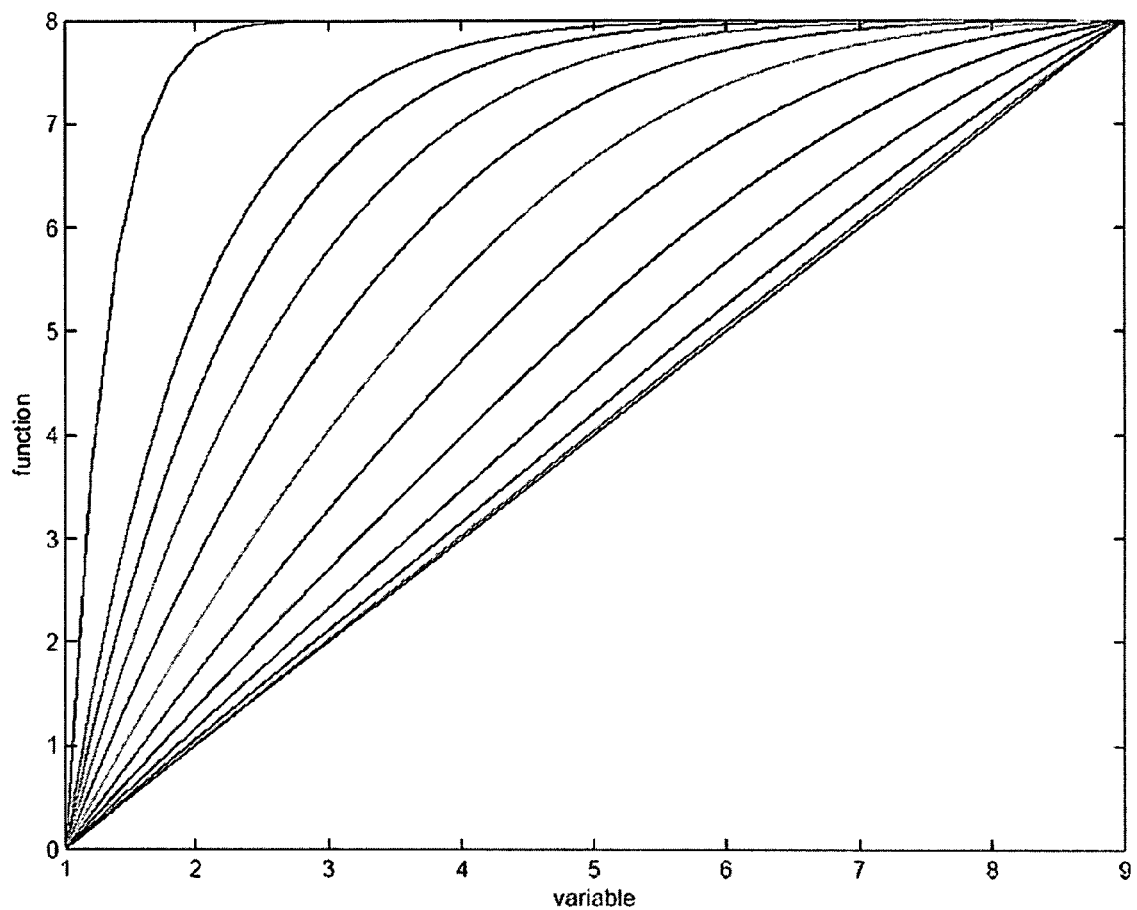
FIG. 7 illustrates exemplary nondecreasing concave bases in accordance with an embodiment of the present invention.

$I_i^{(ndc)}$ of order 11 with boundary knots at $-3$ and 13 and an interior knot at 5 are graphed in FIG. 7. The plotted functions are rescaled to meet at $x=9$ to help visualize different curvatures. Nonincreasing bases are defined by a mirror image of the above bases:

$$I_i^{(niv)}(x,k) = I_i^{(ndv)}(t_{m+1} - x, k) \quad (7)$$

$$I_i^{(nic)}(x,k) = I_i^{(niv)}(t_{m+1} - x, k) \quad (8)$$

We can now consider the multivariate predictor case. Let $x = (x_1, \ldots, x_p)$ denote the predictor vector. Typically, one restricts attention to low-order interactions as the curse of dimensionality makes estimation of high-order interactions be subject to high estimation variance. To simplify notation we will discuss the case of bivariate interactions in detail. The basis to be used consists of tensor products of the corresponding univariate basis functions. More precisely, let $I_{p;i}$ denote the univariate basis in the pth dimension chosen from the bases above. For example, if the pth dimension is to be fitted as nonincreasing, $I_{p;i}(x_p) = I_i^{(ni)}(x_p, k)$ for some k. Then for $1 \leq p \neq r \leq P$.

$$I_{p,r;i,j}(x_p, x_r) = I_{p;i}(x_p) \times I_{r;j}(x_r)$$

is the tensor product bivariate basis in dimensions p and r. The regression function then takes form $$f(x) = \beta_0 + \sum_p \sum_i \beta_{p;i} I_{p;i}(x_p) + \sum_{p<r} \sum_{i,j} \beta_{p,r;i,j} I_{p,r;i,j}(x_p, x_r). \quad (9)$$

In a similar fashion one can add trivariate and higher order terms.

Fitting Process

Assume that we are given data pairs $(x_i, y_i)$; $1 \leq i \leq N$, of predictor vectors $x_i$ and response $y_i$. Now we have to specify the fitting criterion. We can use penalized least squares with a second derivative functional $J(f)$ as the roughness penalty, which is defined as $$J(f) = \int \cdots \int \left[ \sum_p \left( \frac{\partial^2 f}{\partial x_p^2} \right) + \sum_{p<r} 2 \left( \frac{\partial^2 f}{\partial x_p \partial x_r} \right) \right] dx_1 \cdots dx_p. \quad (11)$$

$J(f)$ is a rotation-invariant multivariate version of the univariate smoothing spline penalty—integrated second derivative, which penalizes the curvature of the fitted function. The fitting criterion is then $$\sum_{i=1}^{N} (y_i - f(x_i))^2 + \lambda J(f) \quad (12)$$

which is optimized over the nonnegative coefficient vector $\beta$ used to generate $f(x)$ in equation (9). As will be shown below, $J(f)$ is a quadratic form in $\beta$, although it will also become clear that it is a hard problem to actually compute it. This is then a quadratic programming problem with quadratic objective (12) subject to linear constraints $\beta_{[I]} \geq 0$, which is commonly solved via the multiplicative updates method that takes advantage of the simple form of the constraints. Its implementation is outlined below.

To see that $J(f)$ is a quadratic form and how its computation can be implemented, we will discuss term $$\left( \frac{\partial^2 f}{\partial x_p^2} \right)$$

only for the bivariate-terms only model (10). Other computations are analogous.

$$\left( \frac{\partial^2 f}{\partial x_p^2} \right)^2 = \left( \sum_{s<r} \sum_{i,j} \beta_{s,r;i,j} \frac{\partial^2 (I_{s;i}(x_s) \times I_{r;j}(x_r))}{\partial x_p^2} \right)^2$$

$$= \left( \sum_{r \neq p} \sum_{i,j} \beta_{[p,r;i,j]} I_{p;i}''(x_p) \times I_{r;j}(x_r) \right)^2$$

$$= \sum_{r,s \neq p} \sum_{i,i',j,k} \beta_{[p,r;i,j]} \beta_{[p,s;i',k]} I_{p;i}''(x_p) \times$$

$$I_{p;j}''(x_p) \times I_{r;j}(x_r) \times I_{s;k}(x_s),$$

where $\beta_{[p,r;i,j]}=\beta_{p,r;i,j}$ if p<r and $\beta_{[p,r;i,j]}=\beta_{r,p;j,i}$ if p>r. Therefore, $$\int \cdots \int \left(\frac{\partial^2 f}{\partial x_p^2}\right)^2 dx_1 \cdots dx_p = \sum_{r,s \neq p} \sum_{i,i',j,k} \beta_{[p,r;i,j]} \beta_{[p,s;i',k]} \int \cdots \int I''_{p;i}(x_p) \times$$

$$I''_{p;j}(x_p) \times I_{r;j}(x_r) \times I_{s;k}(x_s) dx_1 \cdots dx_p.$$

Thus, $$\int \cdots \int \left(\frac{\partial^2 f}{\partial x_p^2}\right)^2 dx_1 \cdots dx_p = \beta^T \Omega_p \beta \quad (13)$$

where $\Omega_p$ is a symmetric matrix of size equal to the number of coefficients indexed in the same way as $\beta$ with a generic index of the form (p, r; i, j), p<r. For example, for p<r, s, its entry ((p, r; i, j), (p, s; i', k)) is given by $$(\Omega_p)_{(p,r;i,j)(p,s;i',k)} = \int \cdots \int I''_{p;i}(x_p) \times I''_{p;j}(x_p) \times I_{r;j}(x_r) I_{s;k}(x_s) dx_1 \ldots dx_p.$$

It is seen that this computation is quite cumbersome. It is hard to keep the indices correct even in the case of bivariate terms. Also, it is a hard implementational task to evaluate the integrals. The latter problem is greatly simplified when the domain of integration is a hypercube with sides parallel to the coordinate axes. In that case the integral is a product of univariate integrals. Additionally, the integral is sometimes replaced with a sum of evaluations of the integrand over a grid of points covering the domain of integration.

We now outline a solution to the optimization problem. As we have just seen, the fitting criterion (12) is a quadratic form. Therefore, the target function can equivalently be represented as $$F(\beta) = \frac{1}{2}\beta^T A \beta + b^T \beta \quad (14)$$

for some positive definite matrix A and vector b. The problem is to minimize F over nonnegative $\beta_i$. Since A is positive definite, F is bounded below and its optimization is convex. However, the analytical solution is not known for the non-negativity constraint. Therefore, we resort to an iterative technique. Although a more general quadratic programming method handling arbitrary linear constraints may be used, here we describe the multiplicative updates method in [Sha] (F. Sha, L. Saul and D. D. Lee. (2002) "Multiplicative Updates for Nonnegative Quadratic Programming in Support Vector Machines," Technical Report MS-CIS-02-19, University of Pennsylvania). This method takes advantage of the simple constraint form $\beta_i > 0$.

Let A+ and A− be the positive and the negative parts of A respectively:

$$A_{ij}^+ \begin{cases} A_{ij}, & \text{if } A_{ij} > 0 \\ 0, & \text{otherwise} \end{cases},$$

$$A_{ij}^- \begin{cases} -A_{ij}, & \text{if } A_{ij} < 0 \\ 0, & \text{otherwise} \end{cases},$$

where, say, $A_{ij}^+$ denotes the (i,j)-entry of matrix A+. The vector $\beta$ is updated via the following formula applied to all coordinates simultaneously (in parallel):

$$\beta_i \leftarrow \beta_i \left[\frac{-b_i + \sqrt{b_i^2 + a(A^+\beta)_i(A^-\beta)_i}}{2(A^+\beta)_i}\right].$$

Theorem 1 in [Sha] states that $F(\beta)$ decreases monotonically to its global minimum.

Model Selection

We now discuss the choice of a subset of basis functions and the roughness penalty coefficient $\lambda$. As we mentioned previously, not every basis that satisfies derivative constraints fulfills the requirements of an extrapolation model. Additionally, while satisfying derivative constraints, some basis functions may have shapes that are not expected of the fit. Thus, we identify the following steps in selecting a model.

First, appropriate derivative constraints are imposed and the corresponding full bases are built as described above. Nonnegative linear combinations of these basis functions are expected to contain all the shapes in which we may be interested.

Second, those basis functions whose shapes are subjectively judged not to be of interest are discarded. Subjectivity means that this has to be done by the modeler as opposed to being inferred from the data. To see why subjectivity may be necessary, consider having two basis functions that are similar and increasing over the range of the data. In the extrapolation region, however, one continues to increase, while the other quickly becomes flat. Of course, as we have explained above, such a basis is not appropriate. One of these functions has to be dropped. The question now is which function to drop. The data cannot distinguish between the two since they are similar over the range of the data. Therefore, this decision has to be made subjectively based on the desired shape of the fitted function. Indeed, it is conceivable to have many functions that satisfy derivative constraints, give similar fits over the data, and yet provide very different extrapolation extensions.

At this point, any extrapolation fit would follow a reasonable shape since all poorly shaped basis functions have been discarded. However, there is still no guarantee that the chosen basis functions are sufficiently different over the range of the data. Therefore, our third step is to choose an appropriate $\lambda$ and to make sure that we do not simultaneously use basis functions that are similar over the range of the data and are different in the extrapolation region as discussed in paragraph three of the introduction. A manifestation of choosing such basis functions is unstable extrapolation: small perturbations of the data set result in notably different extrapolation fits. We have seen examples of unstable extrapolation behavior in the introduction, where small perturbations were given by different noise realizations. Such a technique for quantifying stability is not possible in a real life situation when both the target regression relationship and the noise distribution are unknown.

However, the residual bootstrap technique described in [Efron] (B. Efron and R. J. Tibshirani, *An Introduction to the Bootstrap*, New York: Chapman and Hall, 1993) provides means of assessing the variability of model estimates under an estimated noise distribution. This method provides a straightforward way of computing confidence intervals for the fit at any location. The length of a confidence interval can be taken as a measure of instability. The median length of the intervals over a grid of locations in the extrapolation region is then taken as an instability measure I of the extrapolation fit. The models can then be compared subjectively for fitting the data well and at the same time yielding stable extrapolation. The idea here is that out of all high level trend models under consideration, a more flexible model fits the data better, but also results in less stable extrapolation. More importantly, using basis functions as above increases instability I without improving the fit. The subjectivity of this procedure lies in choosing the tradeoff between goodness of fit and stability. Let E denote an estimated aggregate error of the model. Formally, we are to optimize, $F=E+\eta I$, where $\eta$ is chosen subjectively.

We now give details of this procedure. First, we describe residual bootstrap and formally define I. Second, we discuss the optimization of [Ramsay].

Let $y_i$, $\hat{y}_i$, and $r_i = y_i - \hat{y}_i$ denote the response, the fit, and the residual respectively at the ith data point. To produce a bootstrap fit, $r_i$; $1 \leq i \leq N$ are sampled with replacement N times to produce $r_i^*$, $1 \leq i \leq N$. Thus, some $r_i$ may be replicated while others may not appear at all. The new response $y_i^* = \hat{y}_i + r_i^*$. The new response vector is fitted using the same model to produce bootstrap fit $\hat{f}^*(x)$ over the entire domain (including extrapolation). The procedure of drawing the residuals with replacement, perturbing the fit to generate a new response vector and refitting is repeated M times to produce M bootstrap fits $\hat{f}^{*m}(x)$, $1 \leq m \leq M$. Then for a location $x_0$, a bootstrap $(1-2\alpha)$-confidence interval is defined by $$(\hat{f}^{*(1+aM)}(x_0), \hat{f}^{*((1-a)M)}(x_0)),$$

where $\hat{f}^{*(i)}(x_0)$ stands for the ith lowest value among the $\hat{f}^{*m}(x_0)$. If aM is not an integer, it is rounded down and $(1-a)M$ is rounded up. For example, for M=100, the 90% confidence interval is defined to be between the 6th smallest and the 95th smallest bootstrap fits at the location of interest.

Residual bootstrap can be heuristically justified as follows. If the target function estimate is fitted with a well chosen model, the fit will approximate the target function and the residuals will approximate the noise in the data. The variability is studied with respect to different noise realizations. These are generated by drawing with replacement from the observed residuals. This approximates a draw from the noise distribution. One can think of this as studying variability of the fit under typical perturbation of the data set.

Now given a grid $x_j$, $1 \leq j \leq J$ of locations in the extrapolation region, compute the lengths $I_j$ of the bootstrap confidence intervals as above. Let I be the median of the $I_j$, $1 \leq j \leq J$.

The selection procedure might be defined as follows. For a given subset of the appropriate basis and a given, estimate the aggregate error of the model by averaging a standard error estimate, such as cross-validation, over a data region grid of locations. Then carry out residual bootstrap to determine instability measure I and compute F using [Ramsay]. Choose the model with the smallest F.

While feasible, such procedure is likely to be time consuming since optimization must be carried out over different subsets of the basis and over $\lambda$ simultaneously. Also, the number of different subsets of interest will usually be small, since in most cases it will be apparent whether two or more functions are similar or not. Therefore, for each identified subset of the basis, we propose to choose $\lambda$ via optimizing a standard error estimate and then compute with this value of $\lambda$.

In closing, we would like to briefly discuss using standard model selection methodology in the context of extrapolation models. In general, this does not give useful answers for the extrapolation problem. For example, classical measures, such as cross-validation, $C_p$ statistic, AIC, or BIC, are not useful because they depend only on the fit over the data region and cannot differentiate between different trends on the extrapolation range. Indeed, they present different ways of estimating in-sample error, while our interest is estimation away from the sample. Also, estimating the mean squared error of a model as it is done, for example, in the context of local polynomial models for kernel bandwidth selection is infeasible because the bias term is uncontrollable (see [Fan] J. Fan and I. Gijbels (1995), "Data-Driven Bandwidth Selection in Local Polynomial Fitting: Variable Bandwidth and Spatial Adaptation," *Journal of Royal Statistical Society*, Series B, vol. 57, pp. 371-394.)

That being said, the situation changes dramatically when the choice is only among extrapolation models. For two extrapolation fits to be different means being different over the data. The model constraints dispense with the possibility of having similar fits over data that diverge in the extrapolation region. Therefore, if each fit of the data has a natural extension into the extrapolation region, it is reasonable to pick the fit that explains the data best. That can be done using standard model selection procedures, such as those just mentioned.

Changing Extrapolation Horizon

An interesting question is whether it is possible to implement the proposed technique so that one does not have to refit the model if the extrapolation horizon changes. Clearly, to this end all basis functions have to be defined up to the new horizon. Although farther extrapolation would typically require tighter constraints on the fitted function, technically, this should not be hard to do by building suitable bases within the same spline framework for most practical situations. Recall that we previously described the construction of candidate basis functions over any finite domain. If it is possible to anticipate the behavior of the target function over an infinite extrapolation domain, one simple way to build an appropriate basis is to rescale the infinite domain into a finite one with an appropriate transformation. The latter must be isotonic (monotone in each dimension). A univariate example of such a map is arctangent. Modeling and in particular choosing an appropriate basis would then take place over a finite domain as before and the fit would then be transformed back to the original scale. In situations were this strategy may not work, a spline model could still be built on the original scale, but such construction is likely to require a variation of the methods described in this specification.

If the basis is indeed defined over the new extrapolation domain, one can just extend the extrapolation using the same solution (the same coefficient vector $\beta$ in [Mukharjee] H. Mukarjee and S. Stem. (1994) "Feasible Nonparametric Estimation of Multiargument Monotone Functions," *Journal of American Statistical Association*, vol. 89, no. 425, pp. 77-80). In fact, the non-penalized least squares criterion remains the same irrespective of the extrapolation domain attributes. If roughness penalty is used, however, using the same solution corresponds to using the same integration region for evaluating J(f) for any extrapolation domain (see [Holmes] C. C. Holmes and B. K. Mallick. (2001) "Bayesian Regression with Multivariate Linear Splines," *Journal of Royal Statistical Society*, Series B, vol. 63, no. 1, pp 3-18). Thus, one may choose to fix the integration region to be, say, the smallest hypercube containing the data to control overfitting and rely on natural extensions of the basis functions with no additional roughness correction.

Interpolation Correction

As we discussed above, extrapolation is about high level trends of the data. This means that an extrapolation model is not concerned with local features present in the data. The constraints that are fundamental for successfully fitting extrapolation models will typically overlook those. For example, a convexity/concavity constraint will smooth out any bumps. Thus, it is clear that in general, the extrapolation fit over the data region can be improved. What we have in mind is a situation where globally similar data sets yield similar extrapolation trends, but local differences are also modeled.

To enable modeling of local features, it seems appropriate to fit an unconstrained model to the residuals of the extrapolation fit f. This is a standard regression problem. We will call the resultant fit an interpolation correction g. The complete model is then h=f+g. One potential problem with this approach is that at the boundary of the data region, h will in general have a jump that is equal to the magnitude to g at the boundary. Since this is undesirable, g should be restricted to be zero on the boundary of the data region. Additionally, to ensure smoothness, we also require that some of its low order derivatives be zero over the boundary as well. To this end, we propose to model g as a linear combination of smooth basis functions $C_k$ each of which is zero on the boundary:

$$g(\underline{x}) = \sum_k a_k C_k(\underline{x})$$

We will consider the case where the data region is a hyper-rectangle. In that case, we propose to take the $C_k$ to be a tensor product basis constructed from B-spline univariate terms that have boundary knots at the extrema of the rectangle and that have appropriate derivatives equal to zero at the boundary knots. More precisely, let $D=\Pi_{p=1}^P [a_p, b_p]$ be the data region and let us suppose we choose to fit splines of order k so that g has k−1 continuous derivatives. For each p, let $B_{p;i}(x_p, k)$, $1 \leq i \leq m_p$, be B-splines of some order k corresponding to some knot sequence with $t_0 = a_p$ and $t_{m+1} = b_p$. We will keep B-splines with indices $k \leq i \leq m_p - (k-1)$ since these are precisely the ones that have the continuous (k−1)th derivative everywhere by coming into zero smoothly on both sides. Then the corresponding bivariate model, for example, will be $$g(\underline{x}) = \sum_p \sum_{i=k}^{m_p-(k-1)} \gamma_{p;i} B_{p;i} + \sum_{p<r} \sum_{i,j} \gamma_{p,r,i,j} B_{p;i}(x_p) \times B_{r;i}(x_r) \quad (16)$$

Figure 8:
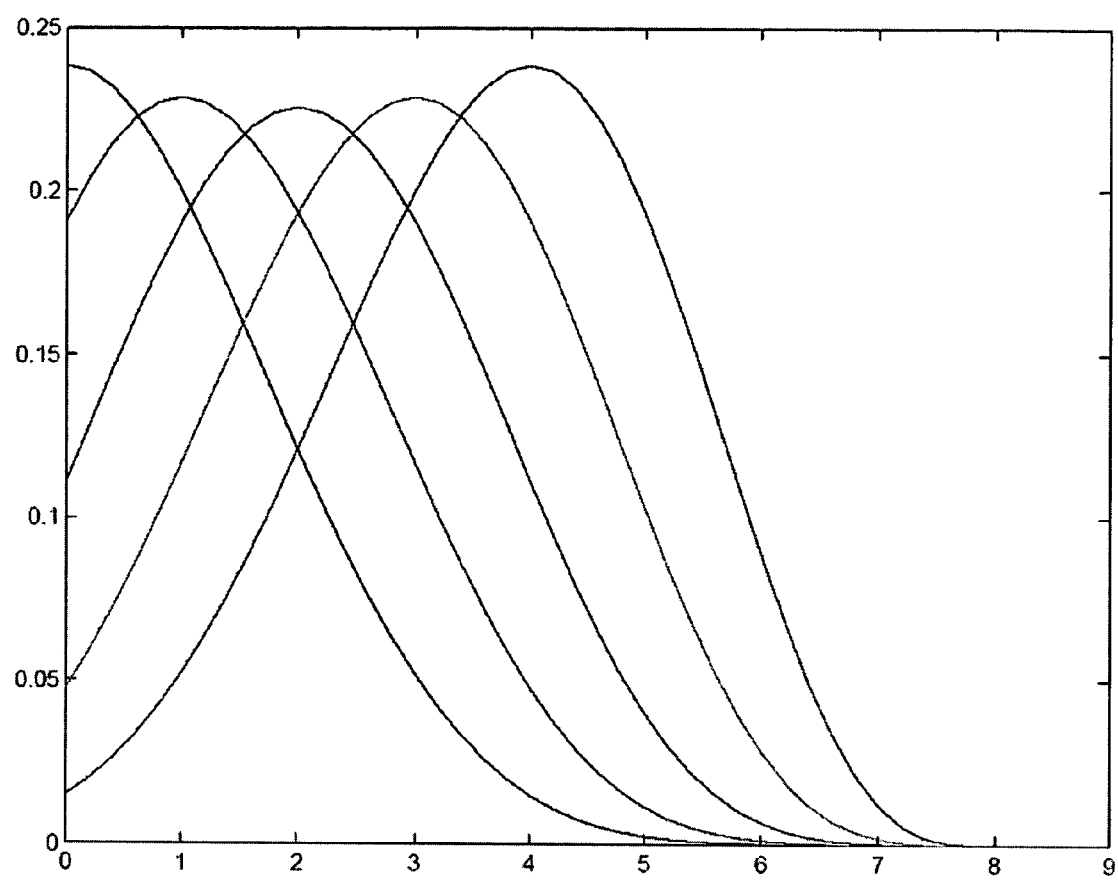
FIG. 8 illustrates exemplary B-spline bases in accordance with an embodiment of the present invention.

Note that the intercept is set to zero. Also, if extrapolation is only required in one direction along some dimension (say, beyond $b_p$, but not beyond $a_p$), only B-splines that do not come into zero smoothly on that side have to be taken out (those with indices $1 \leq i \leq m_p - (k-1)$ are kept). A basis for this situation is shown in FIG. 8. Note that we can use a standard fitting criterion, such as penalized least squares described above.

Cache Rate Modeling

This section describes now the above-described techniques can be applied to cache rate modeling. Table 1 summarizes data and domain ranges for the configuration parameters in the present example. Single level cache rates are of interest. We have five predictors that parameterize a single level cache architecture listed in the first column. Simulated data were obtained at 285 configurations over predictor ranges given in the second column. The ranges in the third column describe the system design region. Thus, the structure of the data is similar to that in the preceding subsection. All predictors are transformed to logarithmic (base 2) scale before modeling. We present modeling of the read miss rate. The emphasis of this study is stability of the fit.

TABLE 1

| Configuration Parameters (predictors) | Simulated (data) | Fitted | Basis |
|---|---|---|---|
| Size | 1MB-32MB | 1MB-512MB | niv |
| Line Size | 64B-256B | 64B-256B | d |
| Associativity | 1-32 | 1-32 | d |
| Sharing (Processors/cache) | 1-#CPUs | 1-#CPUs | ndc |
| Number of processors (#CPUs) | 1-16 | 1-512 | niv |

We fit the full bivariate interactions model, defined in equation (9). The univariate basis functions are given in the fourth column of Table 1 in the notation described above (e.g., "niv" stands for nonincreasing convex). They are chosen based on understanding of the behavior of the modeled benchmark and are corroborated by the data. For example, the read miss rate is expected to decrease with cache size, since a larger cache holds more data and a chance of finding requested data in the cache is greater. On the other hand, the benefit of making the cache larger is expected to yield diminishing returns because the additional part of the cache holds data that are used relatively infrequently. Therefore, we model the effect of the size as nonincreasing convex. As another example, increasing associativity means that there are more places where the data may be placed in the cache and an opportunity to displace the least recently used line. Therefore, this lowers the miss rate. Additionally, the rate is expected to be flat beyond 512 MB in size (because almost all the data now fits in the cache) or beyond 512 processors. Therefore, the boundary knots are chosen at the corresponding points. In the case of sharing, there is believed to be a moderate growth at the end of the domain. The boundary knot is moved beyond the end of the domain to reflect that. This demonstrates the flexibility of our spline-based modeling approach in incorporating additional shape constraints on the fitted function. As both the fit and the stability turn out to be good, we do not carry out the basis function selection part of the procedure described in Section 4.1.

We use CV for selecting an appropriate value for coefficient λ. Table 4 summarizes runs with different values of λ and the corresponding CV errors estimated by (17).

TABLE 2

| λ | 0 | 0.000125 | 0.00025 | 0.0005 | 0.001 | 0.002 |
|---|---|---|---|---|---|---|
| CV Error | 0.0226 | 0.0218 | 0.0216 | 0.0209 | 0.0226 | 0.0230 |

Note that $\lambda=0.0005$ minimizes the CV error and the corresponding model is chosen. Its absolute residuals are summarized in Table 3.

TABLE 3

| median | 75%-tile | 90%-tile |
|---|---|---|
| 0.013 | 0.024 | 0.032 |

To put these numbers in context, we give some percentiles of the responses in the data set. For reference, we also give the corresponding percentiles of the fit over the entire domain (including extrapolation).

TABLE 4

|  | minimum | 25%-tile | median | 75%-tile | maximum |
|---|---|---|---|---|---|
| Responses | 0.065 | 0.146 | 0.238 | 0.368 | 0.925 |
| Fit | 0 | 0.042 | 0.145 | 0.464 | 1.953 |

Residual bootstrap (described above) was used to produce wildly divergent bootstrap fits in the case of a parametric unconstrained model (see J. R. Wendelberger (2003), "Prediction and Bounding of Degradation Paths," Presented at the *Joint Statistical Meeting*, San Francisco, Aug. 3-7, 2003.) The fits looked qualitatively similar to those in FIGS. 1, 3, and 4 indicating great instability of the extrapolation fit. Table 5 summarizes our results. We computed the lengths of the 90% bootstrap confidence intervals for all points in the configuration domain with integer coordinates. For example, in the case of the logarithm of the cache size, these were points with the first coordinate of 0 through 9 (logarithms of 1 and 512). The total number of such points is 7920. Therefore, we obtained 7920 lengths. Table 5 presents different percentiles of these lengths as well as those for the 285 data locations.

TABLE 5

|  | median | 75%-tile | 90%-tile | 95%-tile |
|---|---|---|---|---|
| Data Locations | 0.011 | 0.016 | 0.019 | 0.022 |
| Domain | 0.029 | 0.047 | 0.074 | 0.099 |

Figure 9:
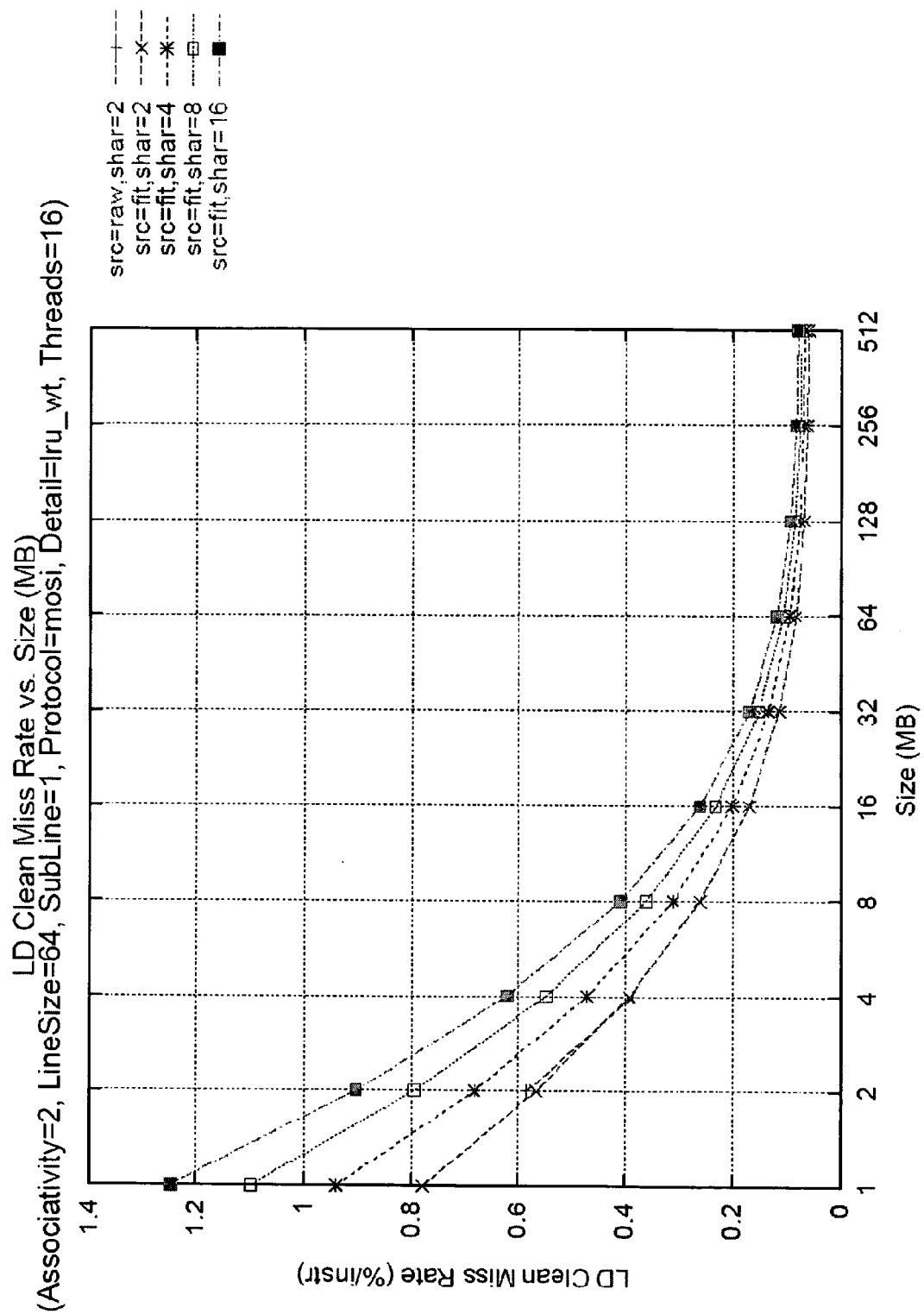
FIG. 9 illustrates raw and fitted surfaces for the read miss rate (along the cache-size axis) in accordance with an embodiment of the present invention.
Figure 10:
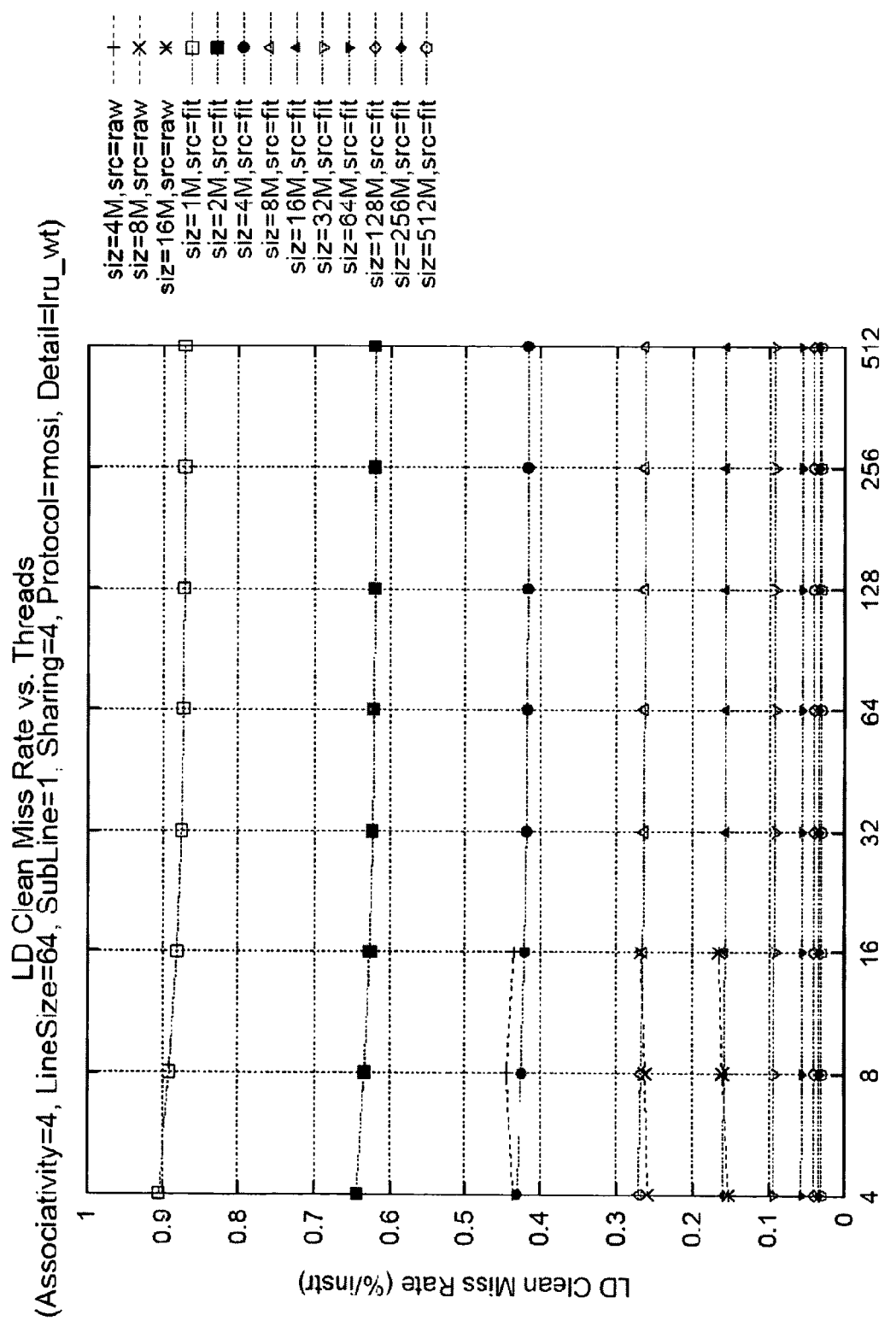
FIG. 10 illustrates raw and fitted surfaces for the read miss rate (along the number-of-threads axis) in accordance with an embodiment of the present invention.

One can observe that relative to the scale of the data in Table 4, the interval lengths are quite small indicating a very stable fit everywhere, including the extrapolation portion. FIGS. 9 and 10 present some typical slices through the fitted surface where we also used the interpolation correction described above. In FIG. 9, each curve corresponds to varying cache size (variable 1) with the rest of the variables fixed at the given values. The different curves correspond to different levels of cache sharing (variable 4). The plot suggests that as the size increases, the penalty for using shared caches decreases with size and eventually becomes negligible for the cache rate under consideration. FIG. 10 depicts a similar slice versus the number of processors (variable 5) with the individual curves corresponding to different levels of size (variable 1). The plot suggests that this cache rate is not sensitive to changes in the number of processors.

Computer System

Figure 11:
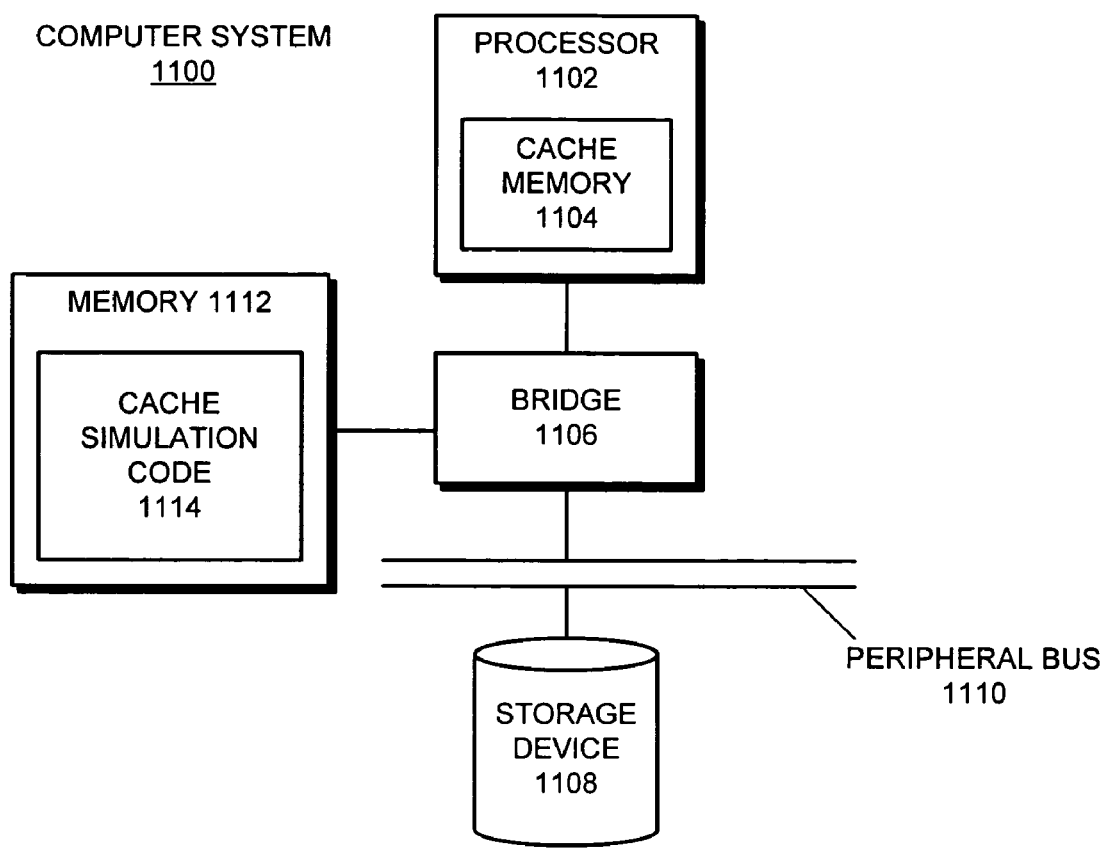
FIG. 11 illustrates a computer system that simulates cache performance in accordance with an embodiment of the present invention.

FIG. 11 illustrates a computer system that simulates cache performance in accordance with an embodiment of the present invention. As illustrated in FIG. 11, computer system 1100 includes processor 1102, which is coupled to a memory 1112 and to peripheral bus 1110 through bridge 1106. Bridge 1106 can generally include any type of circuitry for coupling components of computer system 1100 together. It should be recognized that one or more components of the computer system 1100 may be located remotely and accessed via a network.

Processor 1102 can include any type of processor, including, but not limited to, a microprocessor, a mainframe computer, a digital signal processor, a personal organizer, a device controller and a computational engine within an appliance. Processor 1102 includes an arithmetic unit 1104, which is capable of performing computational operations using floating-point numbers.

Processor 1102 communicates with storage device 1108 through bridge 1106 and peripheral bus 1110. Storage device 1108 can include any type of non-volatile storage device that can be coupled to a computer system. This includes, but is not limited to, magnetic, optical, and magneto-optical storage devices, as well as storage devices based on flash memory and/or battery-backed up memory.

Processor 1102 communicates with memory 1112 through bridge 1106. Memory 1112 can include any type of memory that can store code and data for execution by processor 1102. As illustrated in FIG. 11, memory 1112 contains cache simulation code 1114. The operations performed by this cache simulation code are described in more detail above with reference to FIGS. 1-10.

Note that although the present invention is described in the context of computer system 1100 illustrated in FIG. 11, the present invention can generally operate on any type of computing device that can perform computations involving floating-point numbers. Hence, the present invention is not limited to the computer system 1100 illustrated in FIG. 11.

Computer System to be Simulated

Figure 12:
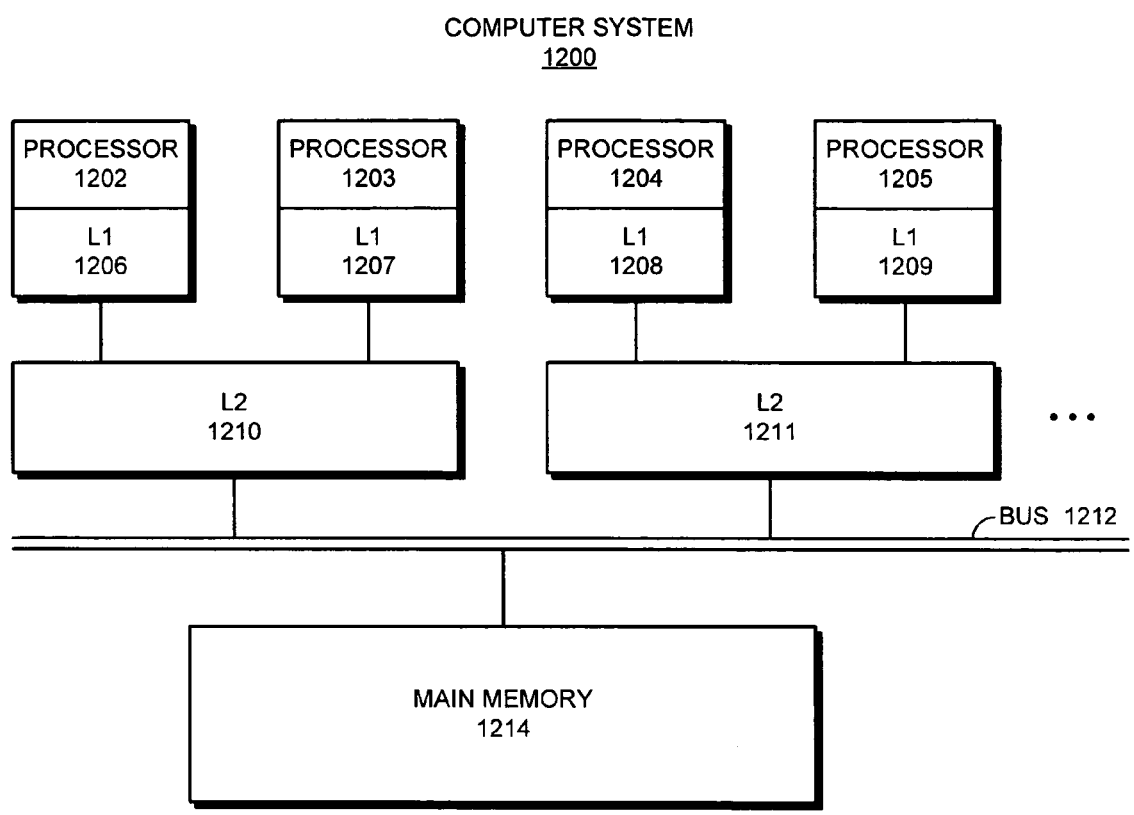
FIG. 12 illustrates an exemplary multiprocessor system to be simulated.

The computer system illustrates in FIG. 11 simulates the cache performance for a computer system, such as the computer system illustrated in FIG. 12.

FIG. 12 illustrates an exemplary computer system to be modeled 1200 in accordance with an embodiment of the present invention. Computer system 1200 includes a number of processors 1202-1205, which are coupled to respective level 1 (L1) caches 1206-1209. (Note that L1 caches 1206-1209 can include separate instruction and data caches.) L1 caches 1206-1209 are coupled to level 2 (L2) caches 1210-1211. More specifically, L1 caches 1206-1207 are coupled to L2 cache 1210, and L1 caches 1208-1209 are coupled to L2 cache 1211. L2 caches 1210-1211 are themselves coupled to main memory 1214 through bus 1212. One or more components of the computer system 1200 may be located remotely and accessed via a network. Note that the present invention can generally be used to simulate the performance of any type of computer system and is not meant to be limited to the exemplary computer system illustrated in FIG. 12.

Summary of the Cache Rate Extrapolation Process

Figure 13:
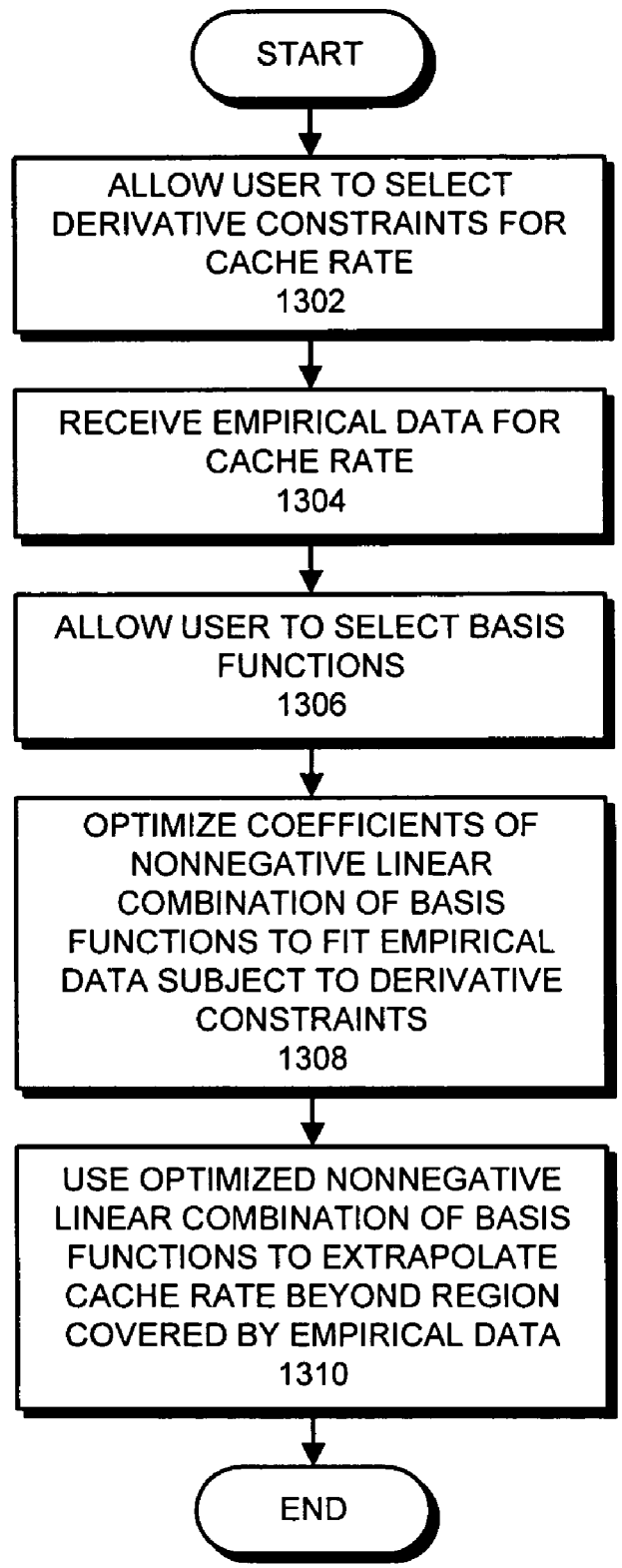
FIG. 13 presents a flow chart illustrating how cache rates are extrapolated in accordance with an embodiment of the present invention.

FIG. 13 presents a flow chart illustrating how cache rates are extrapolated in accordance with an embodiment of the present invention. First, the system allows a user to select derivative constraints for the cache rate (step 1302). For example, the user can specify that the cache rate is: concave increasing, concave increasing with a linear asymptote, concave increasing with a horizontal asymptote, convex decreasing, or convex decreasing with a horizontal asymptote, or linear. The system also allows the user to select bases to use in modeling the cache rate (step 1304). The system additionally receives empirical data for the cache rate (step 1306). (A number of different cache rates are enumerated in the Summary section or this specification.)

Next, as described above, the system optimizes coefficients of a nonnegative linear combination of the bases to fit the empirical data subject to the derivative constraints (step 1308). This can involve optimizing a penalized least squares criterion over the nonnegative linear combinations of bases.

Finally, the system uses the optimized nonnegative linear combination of bases to extrapolate the cache rate beyond the region covered by the empirical data (step 1310).

During the above-described process, the system can the system can form multivariate bases for the cache rate by performing tensor product operations on univariate bases for the cache rate.

The system can also perturb the empirical data to determine if the bases exhibit unstable extrapolation behavior, and can then throw out bases which exhibit unstable extrapolation behavior.

Selecting Candidate Bases

Figure 14:
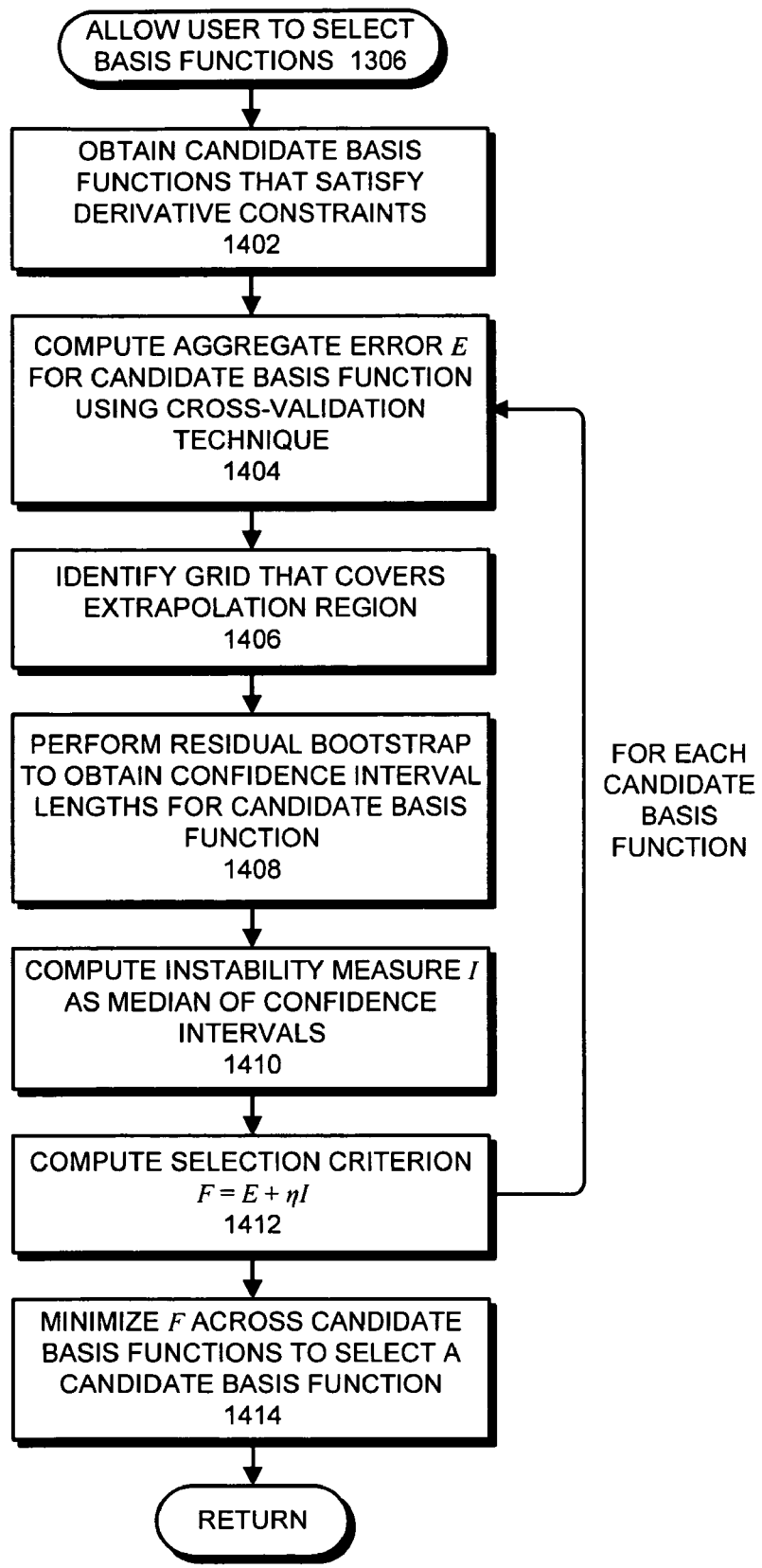
FIG. 14 presents a flow chart illustrating how candidate bases are selected for the regression model for cache performance in accordance with an embodiment of the present invention.

FIG. 14 presents a flow chart illustrating how candidate bases are selected for the regression model in accordance with an embodiment of the present invention. Note that this flow chart illustrates some of the operations that take place during step 1306 in the flow chart in FIG. 13.

First, the system obtains candidate bases that satisfy the derivative constraints (step 1402). As mentioned above, in one embodiment of the present invention, these candidate bases are B-splines. Furthermore, in addition to obtaining the candidate bases, the system can use a cross-validation technique to compute a roughness penalty coefficient λ (which is part of a fitting criterion) for each candidate basis.

Next, the system computes a selection criterion F for each of the candidate bases. In doing so, the system computes the aggregate error E incurred using the candidate basis over the empirical data. This can involve using a cross-validation technique as was described above (step 1404).

The system also computes an instability measure I of an extrapolation fit for using the candidate basis over the extrapolation region. This involves first identifying a grid that covers the extrapolation region (step 1406), and then performing a residual bootstrap operation to obtain confidence interval lengths for the candidate basis at grid vertices (step 1408). The system then computes the instability measure I as the median of the confidence interval lengths (step 1410).

The system then computes the selection criterion for the candidate basis by computing F=E+ηI(step 1412).

Finally, the system minimizes the selection criterion F across the candidate bases to select at least one candidate basis to be used for the regression model (step 1414).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selecting bases to form a regression model cache for performance, comprising:
   obtaining empirical data for a cache rate;
   obtaining derivative constraints for the cache rate;
   obtaining candidate bases that satisfy the derivative constraints;
   for each candidate basis,
      computing an aggregate error E incurred using the candidate basis over the empirical data;
      computing an instability measure I of an extrapolation fit for using the candidate basis over an extrapolation region; and
      computing a selection criterion F for the candidate basis, wherein F is a function of E and I; and
   minimizing the selection criterion F across the candidate bases to select a candidate basis to be used for the regression model.

2. The method of claim 1, wherein computing the selection criterion involves computing F=E+ηI.

3. The method of claim 1, wherein computing the aggregate error E for the candidate basis involves using a cross-validation technique to compute the aggregate error E.

4. The method of claim 1, wherein computing the instability measure I over the extrapolation region for the candidate basis involves:
   identifying a grid that covers the extrapolation region;
   performing a residual bootstrap operation to obtain confidence interval lengths for the candidate basis at grid vertices; and
   computing the instability measure I as the median of the confidence interval lengths.

5. The method of claim 1, wherein obtaining the candidate bases additionally involves using a cross-validation technique to compute a roughness penalty coefficient λ (which is part of a fitting criterion) for each candidate basis.

6. The method of claim 1, wherein obtaining candidate bases that satisfy the derivative constraints involves obtaining B-spline functions that satisfy the derivative constraints.

7. The method of claim 6, wherein obtaining candidate bases that satisfy the derivative constraints involves:
   using a linear combination of integrated B-splines with non-negative coefficients to approximate monotonically increasing functions;
   using integrated B-splines with negative coefficients to approximate monotonically decreasing functions;
   using twice-integrated B-splines with positive coefficients to approximate convex functions; and
   using twice-integrated B-splines with negative coefficients to approximate concave functions.

8. The method of claim 1, further comprising using the regression model to extrapolate cache performance by:
   optimizing coefficients of the regression model subject to the derivative constraints so that the regression model fits the empirical data; and
   using the optimized regression model to extrapolate the cache rate beyond a region covered by the empirical data.

9. The method of claim 8,
   wherein the regression model is a nonnegative linear combination of bases; and
   wherein optimizing the coefficients of the regression model involves optimizing coefficients of the nonnegative linear combination of bases to fit the empirical data subject to the derivative constraints.

10. The method of claim 8, wherein forming the regression model additionally involves forming multivariate bases for the cache rate by performing tensor product operations on univariate bases for the cache rate.

11. The method of claim 1, wherein the derivative constraints can specify that the bases are:
concave increasing;
concave increasing with a linear asymptote;
concave increasing with a horizontal asymptote;
convex decreasing;
convex decreasing with a horizontal asymptote; or
linear.

12. The method of claim 1, wherein the regression model expresses the cache rate as a function of:
cache size;
line size;
associativity;
coherence protocol;
degree of sharing; and/or
number of processors.

13. A computer-readable storage medium storing instructions that when executed by a computer cause the computer to perform a method for selecting bases to form a model for cache performance, the method comprising:
obtaining empirical data for a cache rate;
obtaining derivative constraints for the cache rate;
obtaining candidate bases that satisfy the derivative constraints;
for each candidate basis,
computing an aggregate error E incurred using the candidate basis over the empirical data;
computing an instability measure I of an extrapolation fit for using the candidate basis over an extrapolation region; and
computing a selection criterion F for the candidate basis, wherein F is a function of E and I; and
minimizing the selection criterion F across the candidate bases to select a candidate basis to be used for the regression model.

14. The computer-readable storage medium of claim 13, wherein computing the selection criterion involves computing $F=E+\eta I$.

15. The computer-readable storage medium of claim 13, wherein computing the aggregate error E for the candidate basis involves using a cross-validation technique to compute the aggregate error E.

16. The computer-readable storage medium of claim 13, wherein computing the instability measure I over the extrapolation region for the candidate basis involves:
identifying a grid that covers the extrapolation region;
performing a residual bootstrap operation to obtain confidence interval lengths for the candidate basis at grid vertices; and
computing the instability measure I as the median of the confidence interval lengths.

17. The computer-readable storage medium of claim 13, wherein obtaining the candidate bases additionally involves using a cross-validation technique to compute a roughness penalty coefficient $\lambda$ (which is part of a fitting criterion) for each candidate basis.

18. The computer-readable storage medium of claim 13, wherein obtaining candidate bases that satisfy the derivative constraints involves obtaining B-spline functions that satisfy the derivative constraints.

19. The computer-readable storage medium of claim 13, wherein obtaining candidate bases that satisfy the derivative constraints involves:
using a linear combination of integrated B-splines with non-negative coefficients to approximate monotonically increasing functions;
using integrated B-splines with negative coefficients to approximate monotonically decreasing functions;
using twice-integrated B-splines with positive coefficients to approximate convex functions; and
using twice-integrated B-splines with negative coefficients to approximate concave functions.

20. The computer-readable storage medium of claim 13, wherein the method further comprises using the regression model to extrapolate cache performance by:
optimizing coefficients of the regression model subject to the derivative constraints so that the regression model fits the empirical data; and
using the optimized regression model to extrapolate the cache rate beyond a region covered by the empirical data.

21. The computer-readable storage medium of claim 20, wherein the regression model is a nonnegative linear combination of bases; and
wherein optimizing the coefficients of the regression model involves optimizing coefficients of the nonnegative linear combination of bases to fit the empirical data subject to the derivative constraints.

22. The computer-readable storage medium of claim 20, wherein forming the regression model additionally involves forming multivariate bases for the cache rate by performing tensor product operations on univariate bases for the cache rate.

23. The computer-readable storage medium of claim 13, wherein the derivative constraints can specify that the bases are:
concave increasing;
concave increasing with a linear asymptote;
concave increasing with a horizontal asymptote;
convex decreasing;
convex decreasing with a horizontal asymptote; or
linear.

24. The computer-readable storage medium of claim 13, wherein the regression model expresses the cache rate as a function of:
cache size;
line size;
associativity;
coherence protocol;
degree of sharing; and/or
number of processors.

25. An apparatus that selects bases to form a regression model for cache performance, comprising:
a retrieval mechanism configured to obtain empirical data for a cache rate, and derivative constraints for the cache rate;
a candidate-basis-function-generation mechanism configured to generate candidate bases that satisfy the derivative constraints;
a basis-function-selection mechanism, wherein for each candidate basis, the basis-function-selection mechanism is configured to,
compute an aggregate error E incurred using the candidate basis over the empirical data;
compute an instability measure I of an extrapolation fit for using the candidate basis over an extrapolation region; and to compute a selection criterion F for the candidate basis,
  wherein F is a function of E and I; and
  wherein the basis-function-selection mechanism is configured to minimize the selection criterion F across the candidate bases to select a candidate basis to be used for the regression model.

* * * * *